US012083514B2

(12) United States Patent
Zimmerley et al.

(10) Patent No.: US 12,083,514 B2
(45) Date of Patent: Sep. 10, 2024

(54) INTERPOSER WITH FIRST AND SECOND ADHESIVE LAYERS

(71) Applicant: ILLUMINA, Inc., San Deigo, CA (US)

(72) Inventors: Maxwell Zimmerley, San Diego, CA (US); LiangLiang Qiang, San Diego, CA (US); M. Shane Bowen, Encinitas, CA (US); Steven H. Modiano, San Diego, CA (US); Dajun Yuan, San Diego, CA (US); Randall Smith, San Marcos, CA (US); Arthur J. Pitera, Encinitas, CA (US); Hai Quang Tran, San Diego, CA (US); Gerald Kreindl, Schaerding (AT)

(73) Assignee: ILLUMINA, Inc., San Diego, CA (US)

( * ) Notice: Subject to any disclaimer, the term of this patent is extended or adjusted under 35 U.S.C. 154(b) by 159 days.

(21) Appl. No.: 17/727,622

(22) Filed: Apr. 22, 2022

(65) Prior Publication Data

US 2022/0250066 A1 Aug. 11, 2022

Related U.S. Application Data

(62) Division of application No. 16/457,667, filed on Jun. 28, 2019, now abandoned.

(Continued)

(30) Foreign Application Priority Data

Jul. 23, 2018 (NL) ..................................... 2021377

(51) Int. Cl.
*B01L 3/00* (2006.01)

(52) U.S. Cl.
CPC ... *B01L 3/502715* (2013.01); *B01L 3/502707* (2013.01); *B01L 3/502746* (2013.01)

(58) Field of Classification Search
CPC ......... B01L 2200/0642; B01L 2200/12; B01L 2300/0812; B01L 2300/0829;

(Continued)

(56) References Cited

U.S. PATENT DOCUMENTS 3,950,649 A 4/1976 Yonekubo
4,222,743 A 9/1980 Wang (Continued)

FOREIGN PATENT DOCUMENTS

CN 101498656 A 8/2009
CN 101598717 A 12/2009

(Continued)

OTHER PUBLICATIONS

U.S. Appl. No. 17/214,093, filed Mar. 26, 2021, Feng et al.

(Continued)

*Primary Examiner* — Jennifer Wecker
(74) *Attorney, Agent, or Firm* — Foley & Lardner LLP

(57) ABSTRACT

An interposer for a flow cell comprises a base layer having a first surface and a second surface opposite the first surface. The base layer comprises black polyethylene terephthalate (PET). A first adhesive layer is disposed on the first surface of the base layer. The first adhesive layer comprises methyl acrylic adhesive. A second adhesive layer is disposed on the second surface of the base layer. The second adhesive layer comprises methyl acrylic adhesive. A plurality of microfluidic channels extends through each of the base layer, the first adhesive layer, and the second adhesive layer.

11 Claims, 11 Drawing Sheets

Related U.S. Application Data

(60) Provisional application No. 62/693,762, filed on Jul. 3, 2018.

(58) Field of Classification Search
CPC ......... B01L 2300/0887; B01L 2300/12; B01L 3/502707; B01L 3/502715; B01L 3/502746; B01L 3/5085; B01L 3/56
See application file for complete search history.

(56) References Cited

U.S. PATENT DOCUMENTS

| | | | |
|---|---|---|---|
| 4,563,062 | A | 1/1986 | Kanatani |
| 5,184,021 | A | 2/1993 | Smith |
| 5,324,633 | A | 6/1994 | Fodor et al. |
| 5,422,712 | A | 6/1995 | Ogino |
| 5,451,683 | A | 9/1995 | Barrett et al. |
| 5,482,867 | A | 1/1996 | Barrett et al. |
| 5,491,074 | A | 2/1996 | Aldwin et al. |
| 5,599,675 | A | 2/1997 | Brenner |
| 5,624,711 | A | 4/1997 | Sundberg et al. |
| 5,646,411 | A | 7/1997 | Kain et al. |
| 5,744,305 | A | 4/1998 | Fodor et al. |
| 5,750,341 | A | 5/1998 | Macevicz |
| 5,795,716 | A | 8/1998 | Chee |
| 5,831,070 | A | 11/1998 | Pease et al. |
| 5,856,101 | A | 1/1999 | Hubbell et al. |
| 5,858,659 | A | 1/1999 | Sapolsky et al. |
| 5,874,219 | A | 2/1999 | Rava et al. |
| 5,945,334 | A | 8/1999 | Besemer et al. |
| 5,968,740 | A | 10/1999 | Fodor et al. |
| 5,974,164 | A | 10/1999 | Chee |
| 5,981,185 | A | 11/1999 | Matson et al. |
| 5,981,956 | A | 11/1999 | Stern |
| 6,022,963 | A | 2/2000 | McGall et al. |
| 6,025,601 | A | 2/2000 | Trulson et al. |
| 6,033,860 | A | 3/2000 | Lockhart et al. |
| 6,083,697 | A | 7/2000 | Beecher et al. |
| 6,090,555 | A | 7/2000 | Fiekowsky et al. |
| 6,136,269 | A | 10/2000 | Winkler et al. |
| 6,291,183 | B1 | 9/2001 | Pirrung et al. |
| 6,309,831 | B1 | 10/2001 | Goldberg et al. |
| 6,321,791 | B1 | 11/2001 | Chow |
| 6,327,410 | B1 | 12/2001 | Walt et al. |
| 6,355,431 | B1 | 3/2002 | Chee et al. |
| 6,416,949 | B1 | 7/2002 | Dower et al. |
| 6,428,752 | B1 | 8/2002 | Montagu |
| 6,440,748 | B1 | 8/2002 | Katerkamp et al. |
| 6,482,591 | B2 | 11/2002 | Lockhart et al. |
| 6,509,085 | B1 | 1/2003 | Kennedy |
| 6,569,382 | B1 | 5/2003 | Edman et al. |
| 6,582,660 | B1 | 6/2003 | Heller et al. |
| 6,644,944 | B2 | 11/2003 | Karp |
| 6,652,808 | B1 | 11/2003 | Heller et al. |
| 6,770,441 | B2 | 8/2004 | Dickinson et al. |
| 6,776,094 | B1 | 8/2004 | Whitesides et al. |
| 6,844,184 | B2 | 1/2005 | Kim et al. |
| 6,919,211 | B1 | 7/2005 | Fodor et al. |
| 6,967,074 | B2 | 11/2005 | Duffy et al. |
| 7,030,383 | B2 | 4/2006 | Babayoff et al. |
| 7,033,819 | B2 | 4/2006 | Kim et al. |
| 7,057,026 | B2 | 6/2006 | Barnes et al. |
| 7,067,306 | B2 | 6/2006 | Singhvi et al. |
| 7,109,458 | B2 | 9/2006 | Fairley et al. |
| 7,115,400 | B1 | 10/2006 | Adessi et al. |
| 7,244,559 | B2 | 7/2007 | Rothberg et al. |
| 7,329,860 | B2 | 2/2008 | Feng et al. |
| 7,344,627 | B2 | 3/2008 | Broadley et al. |
| 7,351,376 | B1 | 4/2008 | Quake et al. |
| 7,445,027 | B2 | 11/2008 | Flachsbart et al. |
| 7,473,453 | B2 | 1/2009 | Fisher |
| 8,039,817 | B2 | 10/2011 | Feng et al. |
| 8,071,962 | B1 | 12/2011 | Feng et al. |
| 8,143,599 | B2 | 3/2012 | Feng et al. |
| 8,242,463 | B2 | 8/2012 | Feng et al. |
| 8,278,630 | B1 | 10/2012 | Feng et al. |
| 8,313,906 | B2 | 11/2012 | Cao et al. |
| 8,323,900 | B2 | 12/2012 | Handique et al. |
| 8,357,530 | B2 | 1/2013 | Matsunaga et al. |
| 8,372,577 | B2 | 2/2013 | Tanaka et al. |
| 8,398,936 | B2 | 3/2013 | Horiuchi et al. |
| 8,445,194 | B2 | 5/2013 | Drmanac et al. |
| 8,507,180 | B2 | 8/2013 | Washio et al. |
| 8,546,772 | B2 | 10/2013 | Feng et al. |
| 8,586,947 | B1 | 11/2013 | Feng et al. |
| 8,637,242 | B2 | 1/2014 | Washio et al. |
| 8,698,102 | B2 | 4/2014 | Feng et al. |
| 8,702,948 | B2 | 4/2014 | Ronaghi et al. |
| 8,778,849 | B2 | 7/2014 | Bowen et al. |
| 8,820,883 | B2 | 9/2014 | Wang et al. |
| 8,900,529 | B2 | 12/2014 | Shaikh et al. |
| 8,951,716 | B2 | 2/2015 | Liu et al. |
| 8,951,781 | B2 | 2/2015 | Reed et al. |
| 9,039,997 | B2 | 5/2015 | Cohen et al. |
| 9,068,220 | B2 | 6/2015 | Feng et al. |
| 9,073,962 | B2 | 7/2015 | Fracchia et al. |
| 9,114,396 | B2 | 8/2015 | Tsai et al. |
| 9,352,315 | B2 | 5/2016 | Tsai et al. |
| 9,365,898 | B2 | 6/2016 | Feng et al. |
| 9,458,485 | B2 | 10/2016 | Schultz et al. |
| 9,512,422 | B2 | 12/2016 | Barnard et al. |
| 9,515,159 | B2 | 12/2016 | Bischopink et al. |
| 9,656,260 | B2 | 5/2017 | Tsai et al. |
| 9,764,505 | B2 | 9/2017 | Guenther et al. |
| 9,809,852 | B2 | 11/2017 | Esfandyarpour et al. |
| 9,958,465 | B2 | 5/2018 | Ang et al. |
| 10,486,153 | B2 | 11/2019 | Tsai et al. |
| RE48,219 | E | 9/2020 | Feng et al. |
| RE48,561 | E | 5/2021 | Feng et al. |
| 11,298,697 | B2 | 4/2022 | Tsai et al. |
| 2002/0030811 | A1 | 3/2002 | Schindler |
| 2002/0094572 | A1 | 7/2002 | Singhvi et al. |
| 2002/0102578 | A1 | 8/2002 | Dickinson et al. |
| 2002/0139936 | A1 | 10/2002 | Dumas |
| 2002/0143111 | A1 | 10/2002 | Halverson et al. |
| 2003/0008310 | A1 | 1/2003 | Williams et al. |
| 2003/0011772 | A1 | 1/2003 | Abe et al. |
| 2003/0032048 | A1 | 2/2003 | Kim et al. |
| 2003/0108900 | A1 | 6/2003 | Oliphant et al. |
| 2003/0112432 | A1 | 6/2003 | Yguerabide et al. |
| 2003/0152490 | A1 | 8/2003 | Trulson et al. |
| 2003/0156992 | A1 | 8/2003 | Anderson et al. |
| 2003/0215821 | A1 | 11/2003 | Gunderson et al. |
| 2004/0096831 | A1 | 5/2004 | Hughes |
| 2004/0121066 | A1 | 6/2004 | Anderson et al. |
| 2004/0175710 | A1 | 9/2004 | Haushalter |
| 2004/0185483 | A1 | 9/2004 | Stuelpnagel et al. |
| 2004/0248287 | A1 | 12/2004 | Hu et al. |
| 2005/0057798 | A1 | 3/2005 | Osborne et al. |
| 2005/0064432 | A1 | 3/2005 | Huang et al. |
| 2005/0100900 | A1 | 5/2005 | Kawashima et al. |
| 2005/0181394 | A1 | 8/2005 | Steemers et al. |
| 2005/0191698 | A1 | 9/2005 | Chh et al. |
| 2005/0205422 | A1 | 9/2005 | Moser et al. |
| 2005/0221271 | A1 | 10/2005 | Murphy et al. |
| 2005/0236361 | A1 | 10/2005 | Ufer et al. |
| 2005/0272142 | A1 | 12/2005 | Horita |
| 2006/0065528 | A1 | 3/2006 | Lopez et al. |
| 2006/0188901 | A1 | 8/2006 | Barnes et al. |
| 2006/0240439 | A1 | 10/2006 | Smith et al. |
| 2006/0253035 | A1 | 11/2006 | Stern |
| 2006/0281109 | A1 | 12/2006 | Barr Ost et al. |
| 2006/0292611 | A1 | 12/2006 | Berka et al. |
| 2007/0000866 | A1 | 1/2007 | Ryan et al. |
| 2007/0085334 | A1 | 4/2007 | Watanabe et al. |
| 2007/0114362 | A1 | 5/2007 | Feng et al. |
| 2007/0166705 | A1 | 7/2007 | Milton et al. |
| 2008/0202694 | A1 | 8/2008 | Serbicki et al. |
| 2008/0261288 | A1 | 10/2008 | Gonda et al. |
| 2008/0262747 | A1 | 10/2008 | Kain et al. |
| 2008/0274905 | A1 | 11/2008 | Greene |
| 2008/0292502 | A1 | 11/2008 | Kitawaki et al. |
| 2008/0297911 | A1 | 12/2008 | Christenson et al. |
| 2009/0068759 | A1 | 3/2009 | Arenas et al. |

(56) References Cited

U.S. PATENT DOCUMENTS

2009/0298191 A1 12/2009 Whitesides et al.
2009/0309049 A1 12/2009 Van Dijk et al.
2010/0111768 A1 5/2010 Bnerjee et al.
2010/0193704 A1 8/2010 Pratt et al.
2010/0210008 A1 8/2010 Strand et al.
2010/0233696 A1 9/2010 Joseph et al.
2010/0327184 A1 12/2010 Hayashi
2011/0091864 A1 4/2011 Karlsson et al.
2011/0195260 A1 8/2011 Lee et al.
2012/0004140 A1 1/2012 Staker
2012/0182609 A1 7/2012 Borenstein et al.
2012/0184046 A1 7/2012 Atkin
2012/0319180 A1 12/2012 Chuang et al.
2013/0186575 A1 7/2013 Fujita et al.
2013/0199732 A1 8/2013 Niwa et al.
2013/0344290 A1 12/2013 Yu et al.
2014/0155297 A1 6/2014 Heinz
2014/0243224 A1 8/2014 Barnard et al.
2014/0256030 A1 9/2014 Shen et al.
2014/0272719 A1 9/2014 Liu et al.
2014/0349870 A1 11/2014 Aizenberg et al.
2014/0371091 A1 12/2014 Wiktor et al.
2015/0045234 A1 2/2015 Stone et al.
2015/0087007 A1 3/2015 Meldrum et al.
2015/0093303 A1 4/2015 Tsai et al.
2015/0196912 A1 7/2015 Tsai et al.
2015/0328633 A1* 11/2015 Yoo ...................... C12Q 1/6851 435/6.12
2015/0367346 A1 12/2015 Foster et al.
2015/0375226 A1 12/2015 Yoo
2016/0023208 A1 1/2016 Fisher et al.
2016/0047770 A1* 2/2016 Tyler .................. G01N 33/4836 506/39
2016/0318016 A1 11/2016 Hou et al.
2017/0151584 A1 6/2017 Wiesner et al.
2017/0199210 A1 7/2017 Ang et al.
2017/0326548 A1 11/2017 Tsai et al.
2018/0299380 A1 10/2018 Makino et al.
2020/0009556 A1 1/2020 Zimmerley et al.
2020/0070153 A1 3/2020 Tsai et al.
2020/0347273 A1 11/2020 Stockholm et al.

FOREIGN PATENT DOCUMENTS

CN 101807705 A 8/2010
DE 10014204 A1 10/2001
DE 10 2004 052 495 A1 5/2006
JP 2007-163410 A 6/2007
JP 2007-183258 A 7/2007
JP 2009-500278 A 1/2009
JP 2015-523577 A 8/2015
JP 2016-533283 A 10/2016
RU 2291402 C1 1/2007
TW 201335304 A 9/2013
WO WO-98/44151 A1 10/1998
WO WO-00/18957 A1 4/2000
WO WO-00/63437 A2 10/2000
WO WO-2005/065814 A1 7/2005
WO WO-2006/064199 A1 6/2006
WO WO-2006/106608 A1 10/2006
WO WO-2007/005711 A1 1/2007
WO WO-2007/010251 A2 1/2007
WO WO-2007/123744 A2 11/2007
WO WO-2010/009543 A1 1/2010
WO WO-2010/099350 A2 9/2010
WO WO-2014/018805 A2 1/2014
WO WO-2015/056031 A1 4/2015
WO WO-2017/115863 A1 7/2017
WO WO-2018/032112 A1 2/2018
WO WO 2020/055732 3/2020
WO WO-2020/236945 11/2020

OTHER PUBLICATIONS

U.S. Appl. No. 17/683,293, filed Feb. 28, 2022, Tsai et al.
Applichem GMBH (Darmstadt, Germany), "Contaminations by Nucleic Acids, Problems and Practical Solutions," Nucleic acid decontamination, Brochure, 2008, 1-64.
Chinese Patent Application No. 200981116690.4, Office Action dated Feb. 28, 2013, 9 pages.
Chou, H.-P. et al., "Integrated Elastomer Fluidic Lab-on-a-chip-Surface Patterning and DNA Diagnostics," Proceedings of the Solid State Actuator and Sensor Workshop, Hilton Head, South Carolina, 2000, 4 pages.
Dworkin, M. et al., "Life at High Temperatures," Chapter 1.7, The Prokaryotes: A Handbook on the Biology of Bacteria, Third Edition, vol. 2: Ecophysiology and Biochemistry, 2006, 183-188.
Eddings, M. et al., "Determining the optimal PDMS-PDMS bonding technique for microfluidic devices," J. Micromech. Microeng., 18, 067001, 2008, 4 pages.
EP Application No. 09743421.1, Communication Pursuant to Article 94(3) EPC, Oct. 2, 2015, 4 pages.
Extended European Search Report dated Mar. 30, 2022 in European Application No. 21218167.1-1111.
Extended European Search Report dated Sep. 24, 2019 in European Application No. 19183443.1.
Final Office Action issued on Sep. 7, 2021 in U.S. Appl. No. 16/457,667 (US 2020-009556).
Fiorini, G. et al., "Disposable microfluidic devices: fabrication, function, and application," BioTechniques, vol. 38 (3), Mar. 2005, 429-446.
Flachsbart, B. et al., "Design and fabrication of a multilayered polymer microfluidic chip with nanofluidic interconnects via adhesive contact printing," Lab on a Chip, 6, 2006, 667-674.
Gerday, C. et al., "Extremophiles," Encyclopedia of life support systems (EOLSS), 2009, 194-203.
Grogan, D., "Hyperthermophiles and the problem of DNA instability," Molecular Microbiology, vol. 28 (6), 1998, 1043-1049.
Grover, W. et al., "Monolithic membrane valves and diaphragm pumps for practical large-scale integration into glass microfluidic devices," Sensors and Actuators B, 89, 2003, 315-323.
Hawkins et al., "Nonlinear decrease of background fluorescence in polymer thin-films—a survey of materials and how they can complicate fluorescence detection in µTAS," Lab on a Chip, vol. 3, No. 4 (Sep. 18, 2003) pp. 248-252.
International Search Report dated Aug. 9, 2019 in International Application No. PCT/IB2019/055512.
Karni, M. et al., "Thermal Degradation of DNA," DNA and Cell Biology, vol. 32 (6), 2013, 1-4.
Kim, J. et al., "Rapid prototyping of microfluidic systems using a PDMS/polymer tape composite," Lab on a Chip, vol. 9, 2009, 1290-1293.
Koch Lab: Protocols/Flow cell, https://openwetware.org/mediawiki/index.php?title= Koch_Lab:Protocols/Flow_cell&oldid=397835, accessed on Oct. 25, 2017.
Lee, H.-J. et al., "SPR Imaging Measurements of 1-D and 2-D DNA Microarrays Created from Microfluidic Channels on Gold Thin Films," Anal. Chem. 2001, 73, 2001, 5525-5531.
Lindahl, T. et al., "Rate of Depurination of Native Deoxyribonucleic Acid," Biochemistry, vol. 11 (19), 1972, 3610-3618.
Lindahl, T., "Instability and Decay of the Primary Structure of DNA," Nature, vol. 362, Apr. 22, 1993, 709-715.
Long, Z. et al., "Integrated multilayer microfluidic device with a nanoporous membrane interconnect for online coupling of solid-phase extraction to microchip electrophoresis," Lab Chip, 7, 2007, 1819-1824.
Marguet, E. et al., "DNA stability at temperatures typical for hyperthermophiles," Nucleic acids research, vol. 22 (9), 1994, 1681-1686.
Matsunaga et al., "High-Efficiency Single-Cell Entrapment and Fluorescence in Situ Hybridization Analysis Using a Poly(dimethylsiloxane) Microfluidic Device Integrated with a Black Poly(ethylene terephthalate) Micromesh," Analytical Chemistry, vol. 80, No. 13, (Jun. 7, 2008) pp. 5139-5145.
Meyers, R., "Denaturation of DNA," Molecular Biology and Biotechnology: A Comprehensive Desk Reference, 1995, 206-207.

(56) References Cited

OTHER PUBLICATIONS

Notice of Allowance issued on Dec. 31, 2020 in U.S. Appl. No. 16/000,720.
Notice of Allowance issued on Jan. 11, 2022, in U.S. Appl. No. 16/677,501 (US 2020-0070153).
Notice of Allowance issued on Jul. 23, 2019 in U.S. Appl. No. 15/603,128 (US 2017-0326548).
Office Action dated Apr. 18, 2019 in U.S. Appl. No. 15/603,128 (now U.S. Pat. No. 10,486,153).
Office Action issued on Jun. 25, 2020, in U.S. Appl. No. 16/000,720.
Office Action issued on May 13, 2021, in U.S. Appl. No. 16/457,667 (2020-009556).
Office Action issued on Sep. 30, 2021, in U.S. Appl. No. 16/677,501 (US 2020-0070153).
Ong, S.E. et al., "Fundamental principles and applications of microfluidic systems," Frontiers in Bioscience, vol. 13, Jan. 1, 2008, 2757-2773.
Shendure, et al., "Accurate Multiplex Polony Sequencing of an Evolved Bacterial Genome," Science, vol. 309, Sep. 9, 2005, 1728-1732.
Stroock, A. et al., "Components for integrated poly(dimethylsiloxane) microfluidic systems," Electrophoresis, 23, 2002, 3461-3473.
Sun Wei, "Scanning Probe Microscopy Imaging of Biological Origin and FDTD Simulation of Optical Tweezers," Doctor's Degree Theses from Dalian University of Technology, 2006, 60-67.
U.S. Office Action issued on Dec. 24, 2021 in U.S. Appl. No. 16/457,667 (US 2020-0009556).
Yuen, P.K. et al., "Microfluidic devices for fluidic circulation and mixing improve hybridization signal intensity on DNA arrays," Lab Chip, 3, 2003, 46-50.
Zhang, M. et al., "A simple method for fabricating multi-layer PDMS structures for 3D microfluidic chips," Lab Chip, 10, 2010, 1199-1203.
Office Action issued in JP App No. 2020-572873 dated Jun. 6, 2023.
Non-Final Office Action issued for U.S. Appl. No. 17/214,093 dated Mar. 1, 2023 (12 pages).
Office Action issued in JP App No. JP2020-572873 dated Jan. 9, 2024.

* cited by examiner

INTERPOSER WITH FIRST AND SECOND ADHESIVE LAYERS

CROSS-REFERENCE TO RELATED APPLICATIONS

The present application is a divisional of U.S. application Ser. No. 16/457,667 filed on Jun. 28, 2019, which claims the benefit of U.S. Provisional App. No. 62/693,762, filed Jul. 3, 2018, and claims priority to Netherland Patent App. No. NL 2021377, filed Jul. 23, 2018, the entire disclosures of which are incorporated herein by reference.

BACKGROUND

Various protocols in biological or chemical research involve performing a large number of controlled reactions on local support surfaces or within predefined reaction chambers. The desired reactions may then be observed or detected, and subsequent analysis may help identify or reveal properties of chemicals involved in the reaction. For example, in some multiplex assays, an unknown analyte having an identifiable label (e.g., fluorescent label) may be exposed to thousands of known probes under controlled conditions. Each known probe may be deposited into a corresponding well of a microplate. Observing any chemical reactions that occur between the known probes and the unknown analyte within the wells may help identify or reveal properties of the analyte. Other examples of such protocols include DNA sequencing processes, such as sequencing-by-synthesis or cyclic-array sequencing. In cyclic-array sequencing, a dense array of DNA features (e.g., template nucleic acids) are sequenced through iterative cycles of enzymatic manipulation. After each cycle, an image may be captured and subsequently analyzed with other images to determine a sequence of the DNA features.

Advances in microfluidic technology has enabled development of flow cells that can perform rapid gene sequencing or chemical analysis using nano-liter or even smaller volumes of a sample. Such microfluidic devices desirably may withstand numerous high and low pressure cycles, exposure to corrosive chemicals, variations in temperature and humidity, and provide a high signal-to-noise ratio (SNR).

SUMMARY

Some implementations provided in the present disclosure relate generally to microfluidic devices. An example of a microfluidic device is a flow cell. Some implementations described herein relate generally to microfluidic devices including an interposer, and in particular, to a flow cell that includes an interposer formed from black polyethylene terephthalate (PET) and double-sided acrylic adhesive, and having microfluidic channels defined therethrough. The interposer may be configured to have low auto-fluorescence, high peel and shear strength, and can withstand corrosive chemicals, pressure and temperature cycling.

In a first set of implementations, an interposer comprises a base layer having a first surface and a second surface opposite the first surface. The base layer comprises black polyethylene terephthalate (PET). A first adhesive layer is disposed on the first surface of the base layer. The first adhesive layer comprises acrylic adhesive. A second adhesive layer is disposed on the second surface of the base layer. The second adhesive layer comprises acrylic adhesive. A plurality of microfluidic channels extends through each of the base layer, the first adhesive layer, and the second adhesive layer.

In some implementations of the interposer, a total thickness of the base layer, first adhesive layer, and second adhesive layer is in a range of about 50 to about 200 microns.

In some implementations of the interposer, the base layer has a thickness in a range of about 30 to about 100 microns, and each of the first adhesive layer and the second adhesive layer has a thickness in a range of about 10 to about 50 microns.

In some implementations of the interposer, each of the first and the second adhesive layers has an auto-fluorescence in response to a 532 nm excitation wavelength of less than about 0.25 a.u. relative to a 532 nm fluorescence standard.

In some implementations of the interposer, each of the first and second adhesive layers has an auto-fluorescence in response to a 635 nm excitation wavelength of less than about 0.15 a.u. relative to a 635 nm fluorescence standard.

In some implementations of the interposer, the base layer comprises at least about 50% black PET. In some implementations, the base layer consists essentially of black PET.

In some implementations of the interposer, each of the first and second adhesive layers is made of at least about 10% acrylic adhesive.

In some implementations of the interposer, each of the first and second adhesive layers consists essentially of acrylic adhesive.

In some implementations, a flow cell comprises a first substrate, a second substrate, and any one of the interposers described above.

In some implementations of the flow cell, each of the first and second substrates comprises glass such that a bond between each of the first and second adhesive layers and the respective surfaces of the first and second substrates is adapted to withstand a shear stress of greater than about 50 $N/cm^2$ and a 180 degree peel force of greater than about 1 N/cm.

In some implementations of the flow cell, each of the first and second substrates comprises a resin layer that is less than one micron thick and includes the surface that is bonded to the respective first and second adhesive layers such that a bond between each of the resin layers and the respective first and second adhesive layers is adapted to withstand a shear stress of greater than about 50 $N/cm^2$ and a peel force of greater than about 1 N/cm.

In some implementations of the flow cell, a plurality of wells is imprinted in the resin layer of at least one of the first substrate or the second substrate. A biological probe is disposed in each of the wells, and the microfluidic channels of the interposer are configured to deliver a fluid to the plurality of wells.

In another set of implementations, an interposer comprises a base layer having a first surface and a second surface opposite the first surface. A first adhesive layer is disposed on the first surface of the base layer. A first release liner is disposed on the first adhesive layer. A second adhesive layer is disposed on the second surface of the base layer. A second release liner is disposed on the second adhesive layer. A plurality of microfluidic channels extends through each of the base layer, the first adhesive layer, and the second adhesive layer, and the second release liner, but not through the first release liner.

In some implementations of the interposer, the first release liner has a thickness in a range of about 50 to about 300 microns, and the second release liner has a thickness in a range of about 25 to about 50 microns.

In some implementations of the interposer, the base layer comprises black polyethylene terephthalate (PET); and each of the first and second adhesive layers comprises acrylic adhesive.

In some implementations of the interposer, the first release liner is at least substantially optically opaque and the second release liner is at least substantially optically transparent.

The interposers and flow cells described above and herein may be implemented in any combination to achieve the benefits as described later in this disclosure.

In yet another set of implementations, a method of patterning microfluidic channels, comprises forming an interposer comprising a base layer having a first surface and a second surface opposite the first surface. The base layer comprises black polyethylene terephthalate (PET). A first adhesive layer is disposed on the first surface of the base layer, the first adhesive layer comprising acrylic adhesive, and a second adhesive layer is disposed on the second surface of the base layer, the second adhesive layer comprising acrylic adhesive. Microfluidic channels are formed through at least the base layer, the first adhesive layer, and the second adhesive layer.

In some implementations of the method, the forming microfluidic channels involves using a $CO_2$ laser.

In some implementations, the interposer further comprises a first release liner disposed on the first adhesive layer, and a second release liner disposed on the second adhesive layer. In some implementations, in the step of forming the microfluidic channels, the microfluidic channels are further formed through the second release liner using the $CO_2$ laser, but are not formed through the first release liner.

In some implementations of the method, the $CO_2$ laser has a wavelength in a range of about 5,000 nm to about 15,000 nm, and a beam size in a range of about 50 to about 150 μm.

The methods described above and herein may be implemented in any combination to achieve the benefits as described later in this disclosure.

All of the implementations described above, including the interposers, flow cells, and methods, can be combined in any configuration to achieve the benefits as described later in this disclosure. Further the foregoing implementations and additional implementations discussed in greater detail below (provided such concepts are not mutually inconsistent) are contemplated as being part of the subject matter disclosed herein, and can be combined in any configuration.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
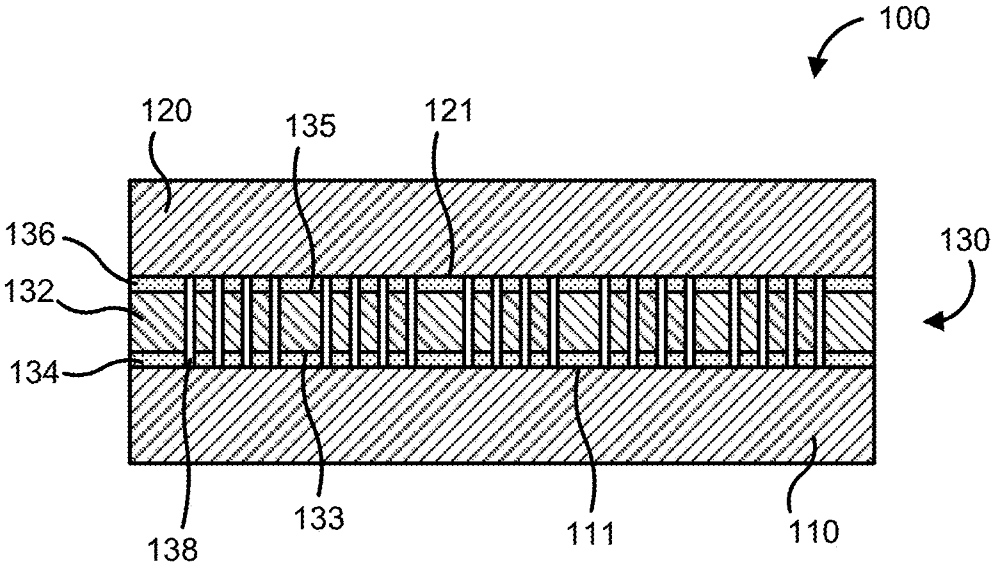
FIG. 1 is a schematic illustration of an example flow cell, according to an implementation.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Provided herein are examples of microfluidic devices. Implementations described herein relate generally to microfluidic devices including an interposer, an in particular, to a flow cell that includes an interposer formed from black polyethylene terephthalate (PET) and double-sided acrylic adhesive, and having microfluidic channels defined therethrough. The interposer is configured to have relatively low auto-fluorescence, relatively high peel and relatively high shear strength, and can withstand corrosive chemicals, pressure and temperature cycling.

Advances in microfluidic technology has enabled development of flow cells that can perform rapid genetic sequencing or chemical analysis using nano-liter or even smaller volumes of a sample. Such microfluidic devices should be capable of withstanding numerous high and low pressure cycles, exposure to corrosive chemicals, variations in temperature and humidity, and provide a high signal-to-noise ratio (SNR). For example, flow cells may comprise various layers that are bonded together via adhesives. It is desirable to structure the various layers so that they may be fabricated and bonded together to form the flow cell in a high throughput fabrication process. Furthermore, various layers should be able to withstand temperature and pressure cycling, corrosive chemicals, and not contribute significantly to noise.

Implementations of the flow cells described herein that include an interposer having a double-sided adhesive and defines microfluidic channels therethrough provide benefits including, for example: (1) allowing wafer scale assembly of a plurality of flow cells, thus enabling high throughput fabrication; (2) providing low auto-fluorescence, high lap shear strength, peel strength and corrosion resistance, that can last through 300 or more thermal cycles at high pH while providing test data with high SNR; (3) enabling fabrication of flat optically interrogateable microfluidic devices by using a flat interposer having the microfluidic channels defined therein; (4) allowing bonding of two resin coated substrates via the double-sided adhesive interposer; and (5) enabling bonding of a microfluidic device including one or more opaque surfaces.

FIG. 1 is a schematic illustration of flow cell [100], according to an implementation. The flow cell [100], may be used for any suitable biological, biochemical or chemical analysis application. For example, the flow cell [100] may include a genetic sequencing (e.g., DNA or RNA) or epigenetic microarrays, or may be configured for high throughput drug screening, DNA or protein fingerprinting, proteomic analysis, chemical detection, any other suitable application or a combination thereof.

The flow cell [100] includes a first substrate [110], a second substrate [120] and an interposer [130] disposed between the first substrate [110] and the second substrate [120]. The first and second substrates [110] and [120] may comprise any suitable material, for example, silicon dioxide, glass, quartz, Pyrex, fused silica, plastics (e.g., polyethylene terephthalate (PET), high density polyethylene (HDPE), low density polyethylene (LDPE), polyvinyl chloride (PVC), polypropylene (PP), polyvinylidene fluoride (PVDF), etc.), polymers, TEFLON®, Kapton (i.e., polyimide), paper based materials (e.g., cellulose, cardboard, etc.), ceramics (e.g., silicon carbide, alumina, aluminum nitride, etc.), complementary metal-oxide semiconductor (CMOS) materials (e.g., silicon, germanium, etc.), or any other suitable material. In some implementation, the first and/or the second substrate [110] and [120] may be optically transparent. In other implementations, the first and/or the second substrate [110] and [120] may be optically opaque. While not shown, the first and/or and the second substrate [110] and [120] may define fluidic inlets or outlets for pumping a fluid to and/or from microfluidic channels [138] defined in the interposer [130]. As described herein, the term "microfluidic channel" implies that at least one dimension of a fluidic channel (e.g., length, width, height, radius or cross-section) is less than 1,000 microns.

In various implementations, a plurality of biological probes may be disposed on a surface [111] of the first substrate [110] and/or a surface [121] of the second substrate [120] positioned proximate to the interposer [130]. The biological probes may be disposed in any suitable array on the surface [111] and/or [121] and may include, for example, DNA probes, RNA probes, antibodies, antigens, enzymes or cells. In some implementations, chemical or biochemical analytes may be disposed on the surface [111] and/or [121]. The biological probes may be covalently bonded to, or immobilized in a gel (e.g., a hydrogel) on the surface [111] and/or [121] of the first and second substrate [110] and [120], respectively. The biological probes may be tagged with fluorescent molecules (e.g., green fluorescent protein (GFP), Eosin Yellow, luminol, fluoresceins, fluorescent red and orange labels, rhodamine derivatives, metal complexes, or any other fluorescent molecule) or bond with target biologics that are fluorescently tagged, such that optical fluorescence may be used to detect (e.g., determine presence or absence of) or sense (e.g., measure a quantity of) the biologics, for example, for DNA sequencing.

The interposer [130] includes a base layer [132] having a first surface [133] facing the first substrate [110], and a second surface [135] opposite the first surface [133] and facing the second substrate [120]. The base layer [132] includes black PET. In some implementations, the base layer [132] may include at least about 50% black PET, or at least about 80% black PET, with the remaining being transparent PET or any other plastic or polymer. In other implementations, the base layer [132] may consist essentially of black PET. In still other implementations, the base layer [132] may consist of black PET. Black PET may have low auto-fluorescence so as to reduce noise as well as provide high contrast, therefore allowing fluorescent imaging of the flow cell with high SNR.

A first adhesive layer [134] is disposed on the first surface [133] of the base layer [132]. The first adhesive layer [134] includes an acrylic adhesive (e.g., a methacrylic or a methacrylate adhesive). Furthermore, a second adhesive layer [136] is disposed on the second surface [135] of the base layer [132]. The second adhesive layer [136] also includes acrylic adhesive (e.g., a methacrylic or a methacrylate adhesive). For example, each of the first adhesive layer [134] and the second adhesive layer [136] may be include at least about 10% acrylic adhesive, or at least about 50% acrylic adhesive, or at least about 80% acrylic adhesive. In some implementations, the first and second adhesive layers [134] and [136] may consist essentially of acrylic adhesive. In some implementations, the first and second adhesive layers [134] and [136] may consist of acrylic adhesive. In particular implementations, the acrylic adhesive may include the adhesive available under the tradename MA-61A™ available from ADHESIVES RESEARCH®. The acrylic adhesive included in the first and second adhesive layers [134] and [136] may be pressure sensitive so as to allow bonding of the base layer [132] of the interposer [130] to the substrates [110] and [120] through application of a suitable pressure. In other implementations, the first and second adhesive layers [134] and [136] may be formulated to be activated via heat, ultra violet (UV) light or any other activations stimuli. In still other implementations, the first adhesive layer [134] and/or the second adhesive layer [136] may include butyl-rubber.

In some implementations, each of the first and second adhesive layers [134] and [136] has an auto-fluorescence in response to a 532 nm excitation wavelength (e.g., a red excitation laser) of less than about 0.25 arbitrary units (a.u.)

relative to a 532 nm fluorescence standard. Furthermore, each of the first and second adhesive layers [134] and [136] may have an auto-fluorescence in response to a 635 nm excitation wavelength (e.g., a green excitation laser) of less than about 0.15 a.u. relative to a 635 nm fluorescence standard. Thus, the first and second adhesive layer [134] and [136] also have low auto-fluorescence such that the combination of the black PET base layer [132] and the first and second adhesive layers [134] and [136] including acrylic adhesive contribute negligibly to the fluorescent signal generated at the biological probe interaction sites and therefore provide high SNR.

A plurality of microfluidic channels [138] extends through each of the first adhesive layer [134], the base layer [132] and the second adhesive layer [136]. The microfluidic channels [138] may be formed using any suitable process, for example, laser cutting (e.g., using a UV nanosecond pulsed laser, a UV picosecond pulsed laser, a UV femtosecond pulsed laser, a $CO_2$ laser or any other suitable laser), stamping, die cutting, water jet cutting, physical or chemical etching or any other suitable process.

In some implementations, the microfluidic channels [138] may be defined using a process which does not significantly increase auto-fluorescence of the first and second adhesive layers [134] and [136], and the base layer [132], while providing a suitable surface finish. For example, a UV nano, femto or picosecond pulsed laser may be able to provide rapid cutting, smooth edges and corners, therefore providing superior surface finish which is desirable, but may also modify the surface chemistry of the acrylic adhesive layers [134] and [136] and/or the black PET base layer [132] which may cause auto-fluorescence in these layers.

In contrast, a $CO_2$ laser may provide a surface finish, which while in some instances may be considered inferior to the UV lasers but remains within design parameters, but does not alter the surface chemistry of the adhesive layers [134] and [136] and/or the base layer [132] so that there is no substantial increase in auto-fluorescence of these layers. In particular implementations, a $CO_2$ laser having a wavelength in a range of about 5,000 nm to about 15,000 nm (e.g., about 5,000, about 6,000, about 7,000, about 8,000, about 9,000, about 10,000, about 11,000, about 12,000, about 13,000, about 14,000 or about 15,000 nm inclusive of all ranges and values therebetween), and a beam size in a range of about 50 μm to about 150 μm (e.g., about 50, about 60, about 70, about 80, about 90, about 100, 1 about 10, about 120, about 130, about 140 or about 150 μm, inclusive of all ranges and values therebetween) may be used to define the microfluidic channels [138] through the first adhesive layer [134], the base layer [132] and the second adhesive layer [136].

As shown in FIG. 1 the first adhesive layer [134] bonds the first surface [133] of the base layer [132] to a surface [111] of the first substrate [110]. Moreover, the second adhesive layer [136] bonds the second surface [135] of the base layer [132] to a surface [121] of the second substrate [120]. In various implementations, the first and second substrates [110] and [120] may comprise glass. A bond between each of the first and second adhesive layers [134] and [136] and the respective surfaces [111] and [121] of the first and second substrates [110] and [120] may be adapted to withstand a shear stress of greater than about 50 $N/cm^2$ and a 180° peel force of greater than about 1 N/cm. In various implementations, the bond may be able withstand pressures in the microfluidic channels [138] of up to about 15 psi (about 103,500 Pascal).

For example, the shear strength and peel strength of the adhesive layers [134] and [136] may be a function of their chemical formulations and their thicknesses relative to the base layer [132]. The acrylic adhesive included in the first and second adhesive layers [134] and [136] provides strong adhesion to the first and second surface [133] and [135] of the base layer [132] and the surface [111] and [121] of the first and second substrates [110] and [120], respectively. Furthermore, to obtain a strong bond between the substrates [110] and [120] and the base layer [132], a thickness of the adhesive layers [134] and [136] relative to the base layer [132] may be chosen so as to transfer a large portion of the peel and/or shear stress applied on the substrates [110] and [120] to the base layer [132].

If the adhesive layers [134] and [136] are too thin, they may not provide sufficient peel and shear strength to withstand the numerous pressure cycles that the flow cell [100] may be subjected to due to flow of pressurized fluid through the microfluidic channels [138]. On the other hand, adhesive layers [134] and [136] that are too thick may result in void or bubble formation in the adhesive layers [134] and [136] which weakens the adhesive strength thereof. Furthermore, a large portion of the stress and shear stress may act on the adhesive layers [134] and [136] and is not transferred to the base layer [132]. This may result in failure of the flow cell due to the rupture of the adhesive layers [134] and/or [136].

In various arrangements, the base layer [132] may have a thickness in a range of about 25 to about 100 microns, and each of the first adhesive layer [134] and the second adhesive layer [136] may have a thickness in a range of about 5 to about 50 microns (e.g., about 5, about 10, about 20, about 30, about 40 or about 50 microns, inclusive of all ranges and values therebetween). Such arrangements, may provide sufficient peel and shear strength, for example, capability of withstanding a shear stress of greater than about 50 $N/cm^2$ and a peel force of greater than about 1 N/cm sufficient to withstand numerous pressure cycles, for example, 100 pressure cycles, 200 pressure cycles, 300 pressure cycles or even more. In particular arrangements, a total thickness of the base layer [132], first adhesive layer [134], and second adhesive layer [136] may be in a range of about 50 to about 200 microns (e.g., about 50, about 100, about 150 or about 200 microns inclusive of all ranges and values therebetween).

In various implementations, adhesion promoters may also be included in the first and second adhesive layers [134] and [136] and/or may be coated on the surfaces [111] and [121] of the substrates [110] and [120], for example, to promote adhesion between the adhesive layers [134] and [136] and the corresponding surfaces [111] and [121]. Suitable adhesion promoters may include, for example, silanes, titanates, isocyanates, any other suitable adhesion promoter or a combination thereof.

The first and second adhesive layers [134] and [136] may be formulated to withstand numerous pressure cycles and have low auto-fluorescence, as previously described herein. During operation, the flow cell may also be exposed to thermal cycling (e.g., from about −80 degrees to about 100 degrees Celsius), high pH (e.g., a pH of up to about 11), vacuum and corrosive reagents (e.g., formamide, buffers and salts). In various implementations, the first and second adhesive layers [134] and [136] may be formulated to withstand thermal cycling in the range of about −80 to about 100 degrees Celsius, resists void formation even in vacuum, and resists corrosion when exposed to a pH of up to about 11 or corrosive reagents such as formamide.

Figure 2:
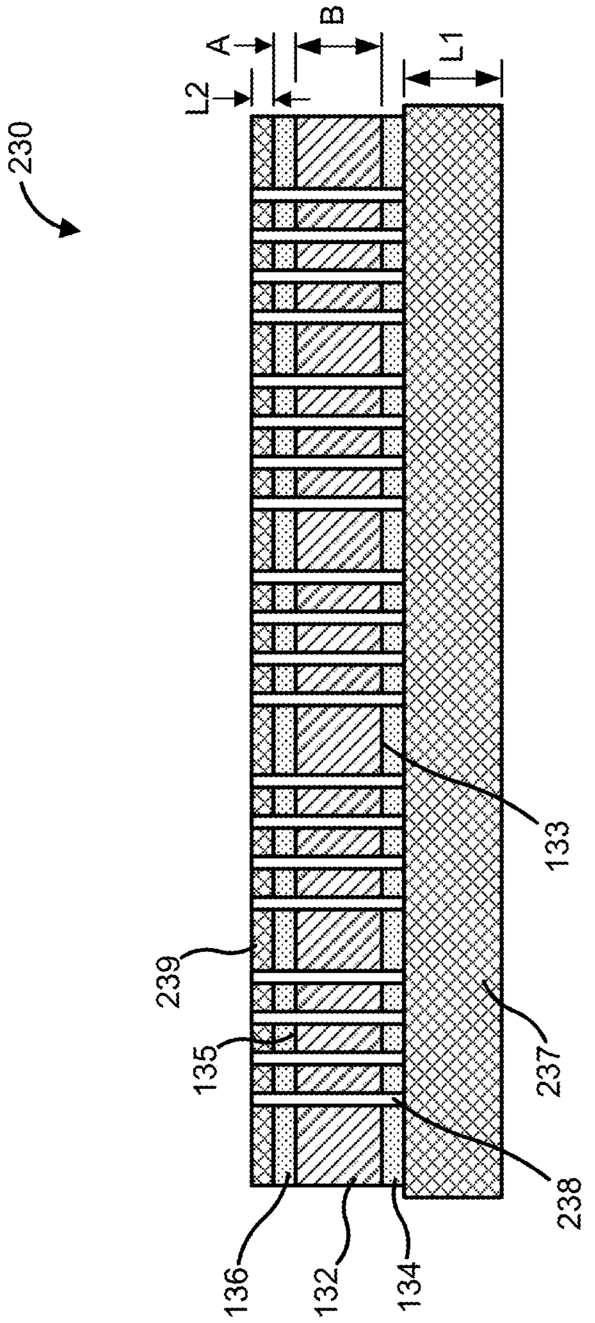
FIG. 2 is a schematic illustration of an example interposer for use in a flow cell, according to an implementation.

FIG. 2 is a schematic illustration of an interposer [230], according to an implementation. The interposer [230] may be used in the flow cell [100] or any other flow cell described herein. The interposer [230] includes the base layer [132], the first adhesive layer [134] and the second adhesive layer [136] which were described in detail with respect to the interposer [130] included in the flow cell [100]. The first adhesive layer [134] is disposed on the first surface [133] of the base layer [132] and the second adhesive layer [136] is disposed on the second surface [135] of the base layer [132] opposite the first surface [133]. The base layer [132] may include black PET, and each of the first and second adhesive layers [134] and [136] may include an acrylic adhesive, as previously described herein. Furthermore, the base layer [132] may have a thickness B in a range of about 30 to about 100 microns (about 30, about 50, about 70, about 90 or about 100 microns inclusive of all ranges and values therebetween), and each of the first and second adhesive layers [134] and [136] may have a thickness A in a range of about 5 to about 50 microns (e.g., about 5, about 10, about 20, about 30, about 40 or about 50 microns inclusive of all ranges and values therebetween).

A first release liner [237] may be disposed on the first adhesive layer [134]. Furthermore, a second release liner [239] may be disposed on the second adhesive layer [136]. The first release line [237] and the second release liner [239] may serve as protective layers for the first and second release liners [237] and [239], respectively and may be configured to be selectively peeled off, or otherwise mechanically removed, to expose the first and second adhesive layers [134] and [136], for example, for bonding the base layer [132] to the first and second substrates [110] and [120], respectively.

The first and second release liners [237] and [239] may be formed from paper (e.g., super calendared Kraft (SCK) paper, SCK paper with polyvinyl alcohol coating, clay coated Kraft paper, machine finished Kraft paper, machine glazed paper, polyolefin coated Kraft papers, etc.), plastic (e.g., biaxially oriented PET film, biaxially oriented polypropylene film, polyolefins, high density polyethylene, low density polyethylene, polypropylene plastic resins, etc.), fabrics (e.g., polyester), nylon, Teflon or any other suitable material. In some implementations, the release liners [237] and [239] may be formed from a low surface energy material (e.g., any of the materials described herein) to facilitate peeling of the release liners [237] and [239] from their respective adhesive layers [134] and [136]. In other implementations, a low surface energy material (e.g., a silicone, wax, polyolefin, etc.) may be coated at least on a surface of the release liners [237] and [239] which is disposed on the respective adhesive layers [134] and [136] to facilitate peeling of the release liners [237] and [239] therefrom.

A plurality of microfluidic channels [238] extends through each of the base layer [132], the first adhesive layer [134], the second adhesive layer [136], and the second release liner [239], but not through the first release liner [237]. For example, the second release liner [239] may be a top release liner of the interposer [230] and defining the microfluidic channels [238] through the second release liner [239], but not in the first release liner [237], may indicate an orientation of the interposer [230] to a user, thereby facilitating the user during fabrication of a flow cell (e.g., the flow cell [100]). Furthermore, a fabrication process of a flow cell (e.g., the flow cell [100]) may be adapted so that the second release liner [239] is initially peeled off from the second adhesive layer [136] for bonding to a substrate (e.g., the second substrate [220]). Subsequently, the first release liner [237] may be removed and the first adhesive layer [134] bonded to another substrate (e.g., the substrate [110]).

The first and second release liners [237] and [239] may have the same or different thicknesses. In some implementations, the first release liner [237] may be substantially thicker than the second release liner [239] (e.g., about 2×, about 4×, about 6×, about 8×, or about 10×, thicker, inclusive), for example, to provide structural rigidity to the interposer [230] and may serve as a handling layer to facilitate handling of the interposer [230] by a user. In particular implementations, the first release liner [237] may have a first thickness L1 in a range of about 50 to about 300 microns (e.g., about 50, about 100, about 150, about 200, about 250 or about 300 microns inclusive of all ranges and values therebetween), and the second release liner [239] may have a second thickness L2 in a range of about 25 to about 50 microns (e.g., about 25, about 30, about 35, about 40, about 45 or about 50 microns inclusive of all ranges and values therebetween).

The first and second release liners [237] and [239] may be optically opaque, transparent or translucent and may have any suitable color. In some implementations, the first release liner [237] may be at least substantially optically opaque (including completely opaque) and the second release liner [239] may be at least substantially optically transparent (including completely transparent). As previously described herein, the second release liner [239] may be removed first from the second adhesive layer [136] for bonding to a corresponding substrate (e.g., the second substrate [120]). Providing optical transparency to the second release liner [239] may allow easy identification of the second release liner [239] from the opaque first release liner [237]. Furthermore, the substantially optically opaque second release liner [239] may provide a suitable contrast to facilitate optical alignment of a substrate (e.g., the second substrate [120]) with the microfluidic channels [238] defined in the interposer [230]. Moreover, having the second release liner [239] being thinner than the first release liner [237] may allow preferential peeling of the second release liner [239] relative to the first release liner [237], therefore preventing unintentional peeling of the first release liner [237] while peeling the second release liner [239] off the second adhesive layer [136].

In some implementations, one or more substrates of a flow cell may include a plurality of wells defined thereon, each well having a biological probe (e.g., an array of the same biological probe or distinct biological probes) disposed therein. In some implementations, the plurality of wells may be etched in the one or more substrates. For example, the substrate (e.g., the substrate [110] or [120]) may include glass and an array of wells are etched in the substrate using a wet etch (e.g., a buffered hydrofluoric acid etch) or a dry etch (e.g., using reactive ion etching (RIE) or deep RIE).

Figure 3:
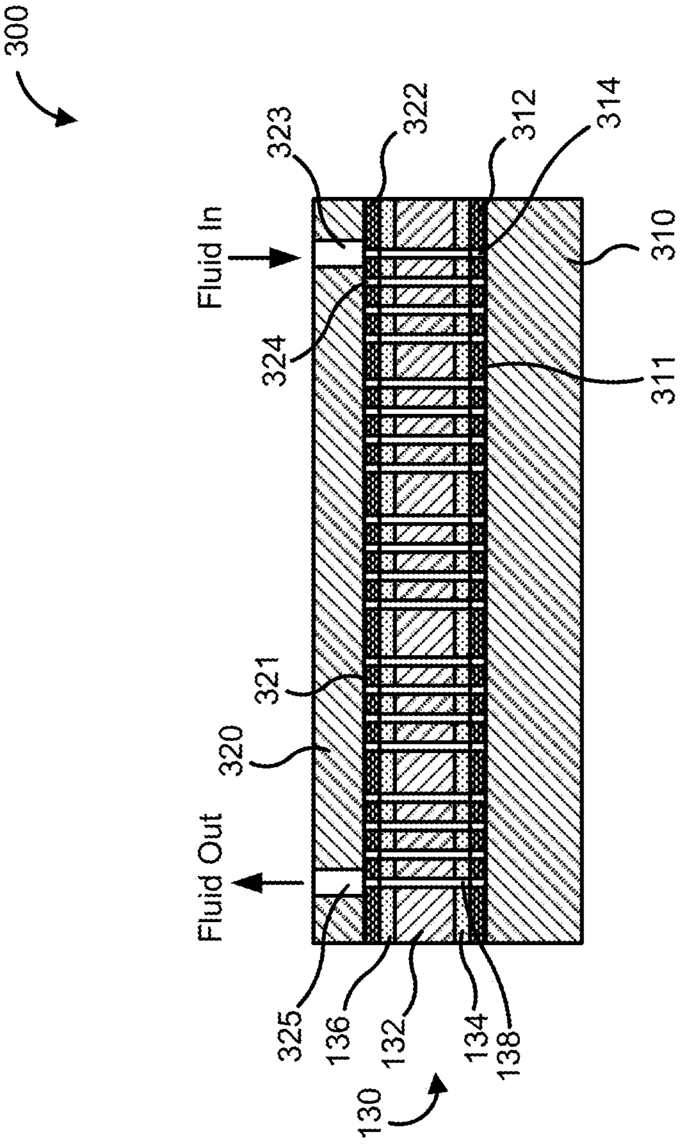
FIG. 3 is a schematic illustration of an example flow cell, according to another implementation.

In other implementations, the plurality of wells may be formed in a resin layer disposed on a surface of the substrate. For example, FIG. 3 is a schematic illustration of a flow cell [300], according to an implementation. The flow cell [300] includes the interposer [130] including the base layer [132], the first adhesive layer [134] and the second adhesive layer [136] and having a plurality of microfluidic channels [138] defined therethrough, as previously described in detail herein.

The flow cell [300] also includes a first substrate [310] and a second substrate [320] with the interposer [132] disposed therebetween. The first and second substrates [310] and [320] may be formed from any suitable material, for example, silicon dioxide, glass, quartz, Pyrex, plastics (e.g., polyethylene terephthalate (PET), high density polyethylene (HDPE), low density polyethylene (LDPE), polyvinyl chloride (PVC), polypropylene (PP), etc.), polymers, TEFLON®, Kapton or any other suitable material. In some implementation, the first and/or the second substrate [310] and [320] may be transparent. In other implementations, the first and/or the second substrate [310] and [320] may be opaque. As shown in FIG. 3, the second substrate [320] (e.g., a top substrate) defines a fluidic inlet [323] for communicating to the microfluidic channels [138], and a fluidic outlet [325] for allowing the fluid to be expelled from the microfluidic channels [138]. While shown as including a single fluid inlet [323] and a single fluidic outlet [325], in various implementations, a plurality of fluidic inlets and/or fluidic outlets may be defined in the second substrate [320]. Furthermore, fluidic inlets and/or outlets may also be provided in the first substrate [310] (e.g., a bottom substrate). In particular implementations, the first substrate [310] may be significantly thicker than the second substrate [320]. For example the first substrate [310] may have a thickness in a range of about 350 to about 500 microns (e.g., about 350, about 400, about 450 or about 500 microns inclusive of all ranges and values therebetween), and the second substrate [320] may have a thickness in a range of about 50 to about 200 microns (e.g., about 50, about 100, about 150 or about 200 microns inclusive of all ranges and values therebetween).

The first substrate [310] includes a first resin layer [312] disposed on a surface [311] thereof facing the interposer [130]. Furthermore, a second resin layer [322] is disposed on a surface [321] of the second substrate [320] facing the interposer [130]. The first and second resin layers [312] and [322] may include, for example, polymethyl methacrylate (PMMA), polystyrene, glycerol 1,3-diglycerolate diacrylate (GDD), Ingacure 907, rhodamine 6G tetrafluoroborate, a UV curable resin (e.g., a novolac epoxy resin, PAK-01, etc.) any other suitable resin or a combination thereof. In particular implementations, the resin layers [312] and [322] may include a nanoimprint lithography (NIL) resin (e.g., PMMA).

In various implementations, the resin layers [312] and [322] may be less than about 1 micron thick and are bonded to the respective first and second adhesive layers [134] and [136]. The first and second adhesive layers [134] and [136] are formulated such that a bond between each of the resin layers [312] and [322] and the respective first and second adhesive layers [134] and [136] is adapted to withstand a shear stress of greater than about 50 $N/cm^2$ and a peel force of greater than about 1 N/cm. Thus, the adhesive layers [134] and [136] form a sufficiently strong bond directly with the respective substrate [310] and [320] or the corresponding resin layers [312] and [322] disposed thereon.

A plurality of wells [314] is formed in the first resin layer [312] by NIL. A plurality of wells [324] may also be formed in the second resin layer [322] by NIL. In other implementations, the plurality of wells [314] may be formed in the first resin layer [312], the second resin layer [322], or both. The plurality of wells may have diameter or cross-section of about 50 microns or less. A biological probe (not shown) may be disposed in each of the plurality of wells [314] and [324]. The biological probe may include, for example, DNA probes, RNA probes, antibodies, antigens, enzymes or cells. In some implementations, chemical or biochemical analytes may be additionally or alternatively disposed in the plurality of wells [314] and [324].

In some implementations, the first and/or second resin layers [312] and [322] may include a first region and a second region. The first region may include a first polymer layer having a first plurality of functional groups providing reactive sites for covalent bonding of a functionalized molecule (e.g., a biological probe such as an oligonucleotide). The first and/or second resin layers [312] and [322] also may have a second region that includes the first polymer layer and a second polymer layer, the second polymer layer being on top of, directly adjacent to, or adjacent to the first polymer layer. The second polymer layer may completely cover the underlying first polymer layer, and may optionally provide a second plurality of functional groups. It should also be realized that the second polymer layer may cover only a portion of the first polymer layer in some implementations. In some implementations the second polymer layer covers a substantial portion of the first polymer layer, wherein the substantial portion includes greater than about 50%, about 55%, about 60%, about 65%, about 70%, about 75%, about 80%, about 85%, about 90%, about 95%, or about 99% coverage of the first polymer layer, or a range defined by any of the two preceding values. In some implementations, the first and the second polymer layers do not comprise silicon or silicon oxide.

In some implementations, the first region is patterned. In some implementations, the first region may include micro-scale or nano-scale patterns. In some such implementations, the micro-scale or nano-scale patterns first and/or second resin layers [312] and [322] channels, trenches, posts, wells, or combinations thereof. For example, the pattern may include a plurality of wells or other features that form an array. High density arrays are characterized as having features separated by less than about 15 μm. Medium density arrays have features separated by about 15 to about 30 μm, while low density arrays have sites separated by greater than about 30 μm. An array useful herein can have, for example, features that are separated by less than about 100 μm, about 50 μm, about 10 μm, about 5 μm, about 1 μm, or about 0.5 μm, or a range defined by any of the two preceding values.

In particular implementations, features defined in the first and/or second resin layer [312] and [322] can each have an area that is larger than about 100 $nm^2$, about 250 $nm^2$, about 500 $nm^2$, about 1 $μm^2$, about 2.5 $μm^2$, about 5 $μm^2$, about 10 $μm^2$, about 100 $μm^2$, or about 500 $μm^2$, or a range defined by any of the two preceding values. Alternatively or additionally, features can each have an area that is smaller than about 1 $mm^2$, about 500 $μm^2$, about 100 $μm^2$, about 25 $μm^2$, about 10 $μm^2$, about 5 $μm^2$, about 1 $μm^2$, about 500 $nm^2$, or about 100 $nm^2$, or a range defined by any of the two preceding values.

As shown in FIG. 3, the first and/or second resin layers [312] and [322] include a plurality of wells [314] and [324] but may also include other features or patterns that include at least about 10, about 100, about $1×10^3$, about $1×10^4$, about $1×10^5$, about $1×10^6$, about $1×10^7$, about $1×10^8$, about $1×10^9$ or more features, or a range defined by any of the two preceding values. Alternatively or additionally, first and/or second resin layers [312] and [322] can include at most about $1×10^9$, about $1×10^8$, about $1×10^7$, about $1×10^6$, about $1×10^5$, about $1×10^4$, about $1×10^3$, about 100, about 10 or fewer features, or a range defined by any of the two preceding values. In some implementations an average pitch of the patterns defined in the first and/or second resin layers [312] and [322] can be, for example, at least about 10 nm, about 0.1 μm, about 0.5 μm, about 1 μm, about 5 μm, about 10 μm, about 100 μm or more, or a range defined by any of the two preceding values. Alternatively or additionally, the average pitch can be, for example, at most about 100 μm, about 10 μm, about 5 μm, about 1 μm, about 0.5 μm, about 0.1 μm or less, or a range defined by any of the two preceding values.

In some implementations, the first region is hydrophilic. In some other implementations, the first region is hydrophobic. The second region can, in turn be hydrophilic or hydrophobic. In particular cases, the first and second regions have opposite character with regard to hydrophobicity and hydrophilicity. In some implementations, the first plurality of functional groups of the first polymer layer is selected from $C_{8-14}$ cycloalkenes, 8 to 14 membered heterocycloalkenes, $C_{8-14}$ cycloalkynes, 8 to 14 membered heterocycloalkynes, alkynyl, vinyl, halo, azido, amino, amido, epoxy, glycidyl, carboxyl, hydrazonyl, hydrazinyl, hydroxy, tetrazolyl, tetrazinyl, nitrile oxide, nitrene, nitrone, or thiol, or optionally substituted variants and combinations thereof. In some such implementations, the first plurality of functional groups is selected from halo, azido, alkynyl, carboxyl, epoxy, glycidyl, norbornene, or amino, or optionally substituted variants and combinations thereof.

In some implementations, the first and/or second resin layers [312] and [322] may include a photocurable polymer composition containing a silsesquioxane cage (also known as a "POSS"). An example of POSS can be that described in Kehagias et al., *Microelectronic Engineering* 86 (2009), pp. 776-778, which is incorporated by reference herein in its entirety. In some cases, a silane may be used to promote adhesion between the substrates [310] and [320] and their respective resin layers [312] and [322]. The ratio of monomers within the final polymer (p:q:n:m) may depend on the stoichiometry of the monomers in the initial polymer formulation mix. The silane molecule contains an epoxy unit which can be incorporated covalently into the first and lower polymer layer contacting the substrates [310] or [320]. The second and upper polymer layer included in the first and/or second resin layers [312] and [322] may be deposited on a semi-cured first polymer layer which may provide sufficient adhesion without the use of a silane. The first polymer layer will naturally propagate polymerization into the monomeric units of the second polymer layer covalently linking them together.

The alkylene bromide groups in the well [314] and [324] walls may act as anchor points for further spatially selective functionalization. For example, the alkylene bromide groups may be reacted with sodium azide to create an azide coated well [314] and [324] surface. This azide surface could then be used directly to capture alkyne terminated oligos, for example, using copper catalyzed click chemistry, or bicyclo [6.1.0] non-4-yne (BCN) terminated oligos using strain promoted catalyst-free click chemistry. Alternatively, sodium azide can be replaced with a norbornene functionalized amine or similar ring-strained alkene or alkyne, such as dibenzocyclooctynes (DIBCO) functionalized amine to provide strained ring moiety to the polymer, which can subsequently undergoing catalyst-free ring strain promoted click reaction with a tetrazine functionalized oligos to graft the primers to surface.

Addition of glycidol to the second photocurable polymer composition may yield a polymer surface with numerous hydroxyl groups. In other implementations, the alkylene bromide groups may be used to produce a primary bromide functionalized surface, which can subsequently be reacted with 5-norbornene-2-methanamine, to create a norbornene coated well surface. The azide containing polymer, for example, poly(N-(5-azidoacetamidylpentyl)acrylamide-co-acrylamide) (PAZAM), may then be coupled selectively to this norbornene surface localized in the wells [314] and [324], and further be grafted with alkyne terminated oligos. Ring-strained alkynes such as BCN or DIBCO terminated oligos may also be used in lieu of the alkyne terminated oligos via a catalyst-free strain promote cycloaddition reaction. With an inert second polymer layer covering the interstitial regions of the substrate, the PAZAM coupling and grafting is localized to the wells [314] and [324]. Alternatively, tetrazine terminated oligos may be grafted directly to the polymer by reacting with the norbornene moiety, thereby eliminating the PAZAM coupling step.

In some implementations, the first photocurable polymer included in the first and/or second resin layers [312] and [322] may include an additive. Various non-limiting examples of additives that may be used in the photocurable polymer composition included in the first and/or second resin layer [312] and [322] include epibromohydrin, glycidol, glycidyl propargyl ether, methyl-5-norbornene-2,3-dicarboxylic anhydride, 3-azido-1-propanol, tert-butyl N-(2-oxiranylmethyl)carbamate, propiolic acid, 11-azido-3,6,9-trioxaundecan-1-amine, cis-epoxysucc 1 mc acid, 5-norbornene-2-methylamine, 4-(2-oxiranylmethyl)morpholine, glycidyltrimethylammonium chloride, phosphomycin disodium salt, poly glycidyl methacrylate, poly(propylene glycol) diglycidyl ether, poly(ethylene glycol) diglycidyl ether, poly[dimethylsiloxane-co-(2-(3,4-epoxycyclohexyl)ethyl)methylsiloxane], poly[(propylmethacryl-heptaisobutyl-PS S)-co-hydroxyethyl methacrylate], poly [(propylmethacryl-heptaisobutyl-PSS)-co-(t-butyl methacrylate)], [(5-bicyclo[2.2.1]hept-2-enyl)ethyl] trimethoxysilane, trans-cyclohexanediolisobutyl POSS, aminopropyl isobutyl POSS, octa tetramethylammonium POSS, poly ethylene glycol POSS, octa dimethylsilane POSS, octa ammonium POSS, octa maleamic acid POSS, trisnorbornenylisobutyl POSS, fumed silica, surfactants, or combinations and derivatives thereof.

Referring to the interposer [130] of FIG. 3, the microfluidic channels [138] of the interposer [130] are configured to deliver a fluid to the plurality of wells [314] and [324]. For example, the interposer [130] may be bonded to the substrates [310] and [320] such that the microfluidic channels [138] are aligned with the corresponding wells [314] and [324]. In some implementations, the microfluidic channels [138] may be structured to deliver the fluid (e.g., blood, plasma, plant extract, cell lysate, saliva, urine, etc.), reactive chemicals, buffers, solvents, fluorescent labels, or any other solution to each of the plurality of wells [314] and [324] sequentially or in parallel.

Figure 4A:
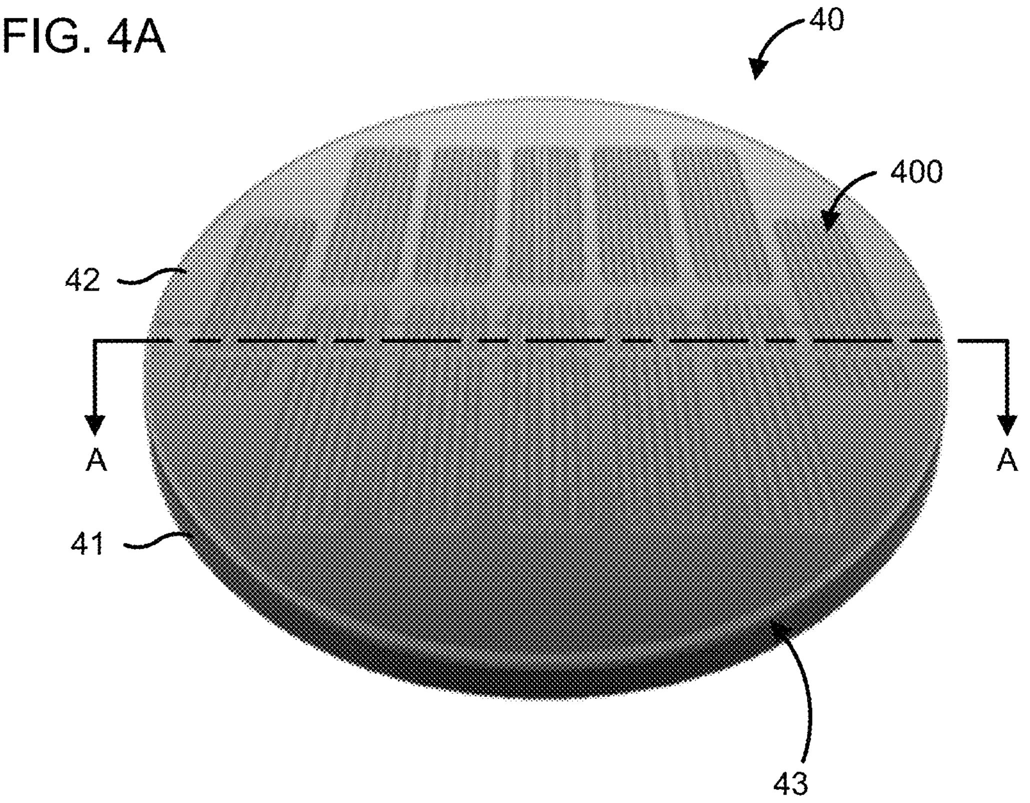
FIG. 4A is a top, perspective view of an example wafer assembly including a plurality of flow cells, according to an implementation.
Figure 4B:
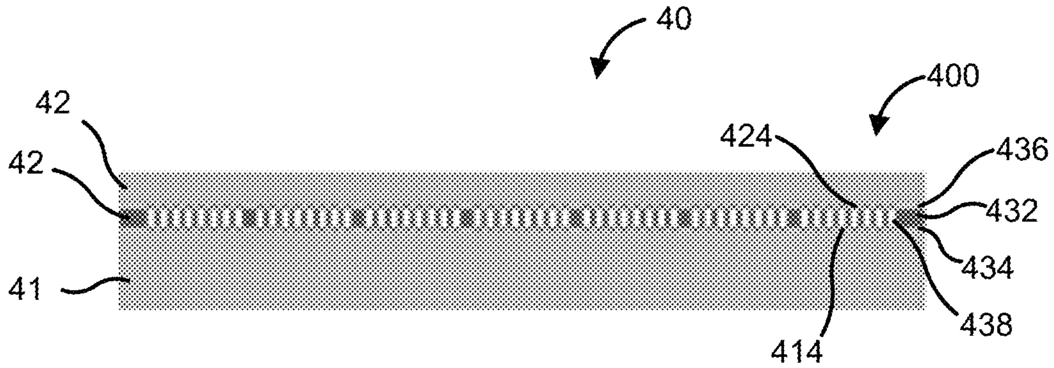
FIG. 4B is a side cross-section of the wafer assembly of FIG. 4A taken along the line A-A shown in FIG. 4.

The flow cells described herein may be particularly amenable to batch fabrication. For example, FIG. 4A is a top perspective view of a wafer assembly [40] including a plurality of flow cells [400]. FIG. 4B shows a side cross-section view of the wafer assembly [40] taken along the line A-A in FIG. 4A. The wafer assembly [40] includes a first substrate wafer [41], a second substrate wafer [42], and an interposer wafer [43] interposed between the first and second substrate wafers [41], [42]. As shown in FIG. 4B the wafer assembly [40] includes a plurality of flow cells [400]. The interposer wafer [43] includes a base layer [432] (e.g., the base layer [132]), a first adhesive layer [434] (e.g., the first adhesive layer [134]) bonding the base layer [432] to a surface of the first substrate wafer [41], and a second adhesive layer [436] (e.g., the second adhesive layer [136]) bonding the base layer [432] to a surface of the second substrate wafer [42].

A plurality of microfluidic channels [438] is defined through each of the base layer [432] and the first and second adhesive layers [434] and [436]. A plurality of wells [414]

and [424] may be defined on each of the first substrate wafer [41] and the second substrate wafer [42] (e.g., etched in the substrate wafers [41] and [42], or defined in a resin layer disposed on the surfaces of the substrate wafers [41] and [42] facing the interposer wafer [43]. A biological probe may be disposed in each the plurality of wells [414] and [424]. The plurality of wells [414] and [424] is fluidly coupled with corresponding microfluidic channels [438] of the interposer wafer [43]. The wafer assembly [40] may then be diced to separate the plurality of flow cells [400] from the wafer assembly [40]. In various implementations, the wafer assembly [40] may provide a flow cell yield of greater than about 90%.

Figure 5:
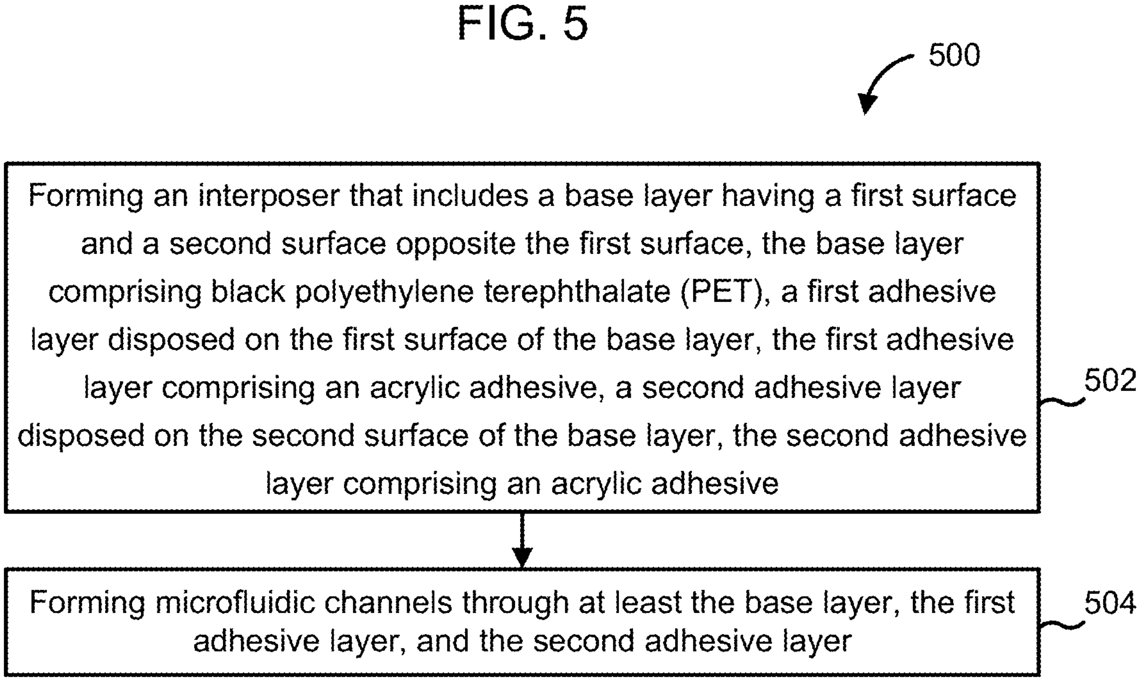
FIG. 5 is a flow diagram of an example method of forming an interposer for a flow cell, according to an implementation.

FIG. 5 is flow diagram of a method [500] for fabricating microfluidic channels in an interposer (e.g., the interposer [130], [230]) of a flow cell (e.g., the flow cell [100], [300], [400]), according to an implementation. The method [500] includes forming an interposer, at [502]. The interposer (e.g., the interposer [130], [230]) includes a base layer (e.g., the baser layer [132]) having a first surface and a second surface opposite the first surface. The base layer includes black PET (e.g., at least about 50% black PET, consisting essentially of black PET, or consisting of black PET). A first adhesive layer (e.g., the first adhesive layer [134]) is disposed on the first surface of the base layer, and a second adhesive layer (e.g., the second adhesive layer [136]) is disposed on the second surface of the base layer. The first and second adhesive layer include an acrylic adhesive (e.g., at least about 10% acrylic adhesive, at least about 50% acrylic adhesive, consisting essentially of acrylic adhesive, or consisting of acrylic adhesive). In some implementations, the adhesive may include butyl-rubber. The base layer may have a thickness of about 30 to about 100 microns, and each of the first and second adhesive layer may have a thickness of about 10 to about 50 microns such that the interposer (e.g., the interposer [130]) may have a thickness in a range of about 50 to about 200 microns.

A first release line (e.g., the first release liner [237]) may be disposed on the first adhesive layer, and a second release liner (e.g. the second release liner [239]) may be disposed on the second adhesive layer. The first and second release liners may be formed from paper (e.g., super calendared Kraft (SCK) paper, SCK paper with polyvinyl alcohol coating, clay coated Kraft paper, machine finished Kraft paper, machine glazed paper, polyolefin coated Kraft papers, etc.), plastic (e.g., biaxially oriented PET film, biaxally oriented polypropylene film, polyolefins, high density polyethylene, low density polyethylene, polypropylene plastic resins, etc.), fabrics (e.g., polyester), nylon, Teflon or any other suitable material. In some implementations, the release liners may be formed from a low surface energy material (e.g., any of the materials described herein) to facilitate peeling of the release liners from their respective adhesive layers. In other implementations, a low surface energy materials (e.g., a silicone, wax, polyolefin, etc.) may be coated at least on a surface of the release liners disposed on the corresponding adhesive layers [134] and [136] to facilitate peeling of the release liners [237] and [239] therefrom. The first release liner may have a thickness in a range of about 50 to about 300 microns (e.g., about 50, about 100, about 150, about 200, about 250, or about 300 microns, inclusive) and in some implementations, may be substantially optically opaque. Furthermore, the second release liner may have a thickness in a range of about 25 to about 50 microns (e.g., about 25, about 30, about 35, about 40, about 45, or about 50 microns, inclusive) and may be substantially transparent.

At [504], microfluidic channels are formed through at least the base layer, the first adhesive layer, and the second adhesive layer. In some implementations in the step of forming the microfluidic channels, the microfluidic channels are formed using a $CO_2$ laser. In some implementations, the microfluidic channels are further formed through the second release liner using the $CO_2$ laser, but are not formed through the first release liner (though in other implementations, the microfluidic channels can extend partially into the first release liner). The $CO_2$ laser may have a wavelength in a range of about 5,000 nm to about 15,000 nm, and a beam size in a range of about 50 to about 150 μm. For example, the $CO_2$ laser may have a wavelength in a range of about 3,000 to about 6,000 nm, about 4,000 to about 10,000 nm, about 5,000 to about 12,000 nm, about 6,000 to about 14,000 nm, about 8,000 to about 16,000 nm or about 10,000 to about 18,000 nm. In particular implementations, the $CO_2$ laser may have a wavelength of about 5,000, about 6,000, about 7,000, about 8,000, about 9,000, about 10,000, about 11,000, about 12,000, about 13,000, about 14,000 or about 15,000 nm inclusive of all ranges and values therebetween. In some implementations, the $CO_2$ laser may have a beam size of about 40 to about 60 μm, about 60 to about 80 μm, about 80 to about 100 μm, about 100 to about 120 μm, about 120 to about 140 μm or about 140 to about 160 μm, inclusive. In particular implementations, may have a beam size of about 50, about 60, about 70, about 80, about 90, about 100, about 110, about 120, about 130, about 140 or about 150 μm inclusive of all ranges and values therebetween.

As previously described herein, various lasers may be used to form the microfluidic channels in the interposer. Important parameters include cutting speed which defines total fabrication time, edge smoothness which is a function of the beam size and wavelength of the laser and chemical changes caused by the laser to the various layers included in the interposer which is a function of the type of the laser. UV pulsed lasers may provide a smaller beam size, therefore providing smoother edges. However, UV lasers may cause changes in the edge chemistry of the adhesive layers, the base layer or debris from the second release liner that may cause auto-fluorescence. The auto-fluorescence may contribute significantly to the fluorescence background signal during fluorescent imaging of a flow cell which includes the interposer described herein, thereby significantly reducing SNR. In contrast, a $CO_2$ laser may provide a suitable edge smoothness, while being chemically inert, therefore not causing any chemical changes in the adhesive layers, the base layer or any debris generated by the second release liner. Thus, forming the microfluidic channels in the interposer using the $CO_2$ laser does not contribute significantly to auto-fluorescence and yields higher SNR.

Non-Limiting Experimental Examples

This section describes various experiments demonstrating the low auto-fluorescence and superior adhesiveness of adhesiveness of an acrylic adhesive. The experimental examples described herein are only illustrations and should not be construed as limiting the disclosure in any way.

Material Properties: Properties of various materials to bond a flow cell and produce high quality sequencing data with low cost were investigated. Following properties are of particular importance: 1) No or low auto-fluorescence: gene sequencing is based on fluorescence tags attached to nucleotides and the signal from these tags are relative weak than normal. No light emitted or scattered from the edge of bonding materials is desirable to improve the signal to noise ratio from the DNA cluster with fluorophores; (2) Bonding strength: Flow cells are often exposed to high pressure (e.g., 13 psi or even higher). High bonding strength including peel and shear stress is desirable for flow cell bonding; (3) Bonding quality: High bonding quality without voids and leakage is the desirable for high quality flow cell bonding; (4) Bonding strength after stress: Gene sequencing involves a lot of buffers (high pH solutions, high salt and elevated temperature) and may also include organic solvents. Holding the flow cells substrates (e.g., a top and bottom substrate) together under such stress is desirable for a successful sequencing run; (5) Chemical stability: It is desirable that the adhesive layers and the base layer are chemically stable and do not release (e.g., out gas) any chemical into the solutions because the enzymes and high purity nucleotides used in gene sequencing are very sensitive to any impurity in the buffer.

Figure 6A:
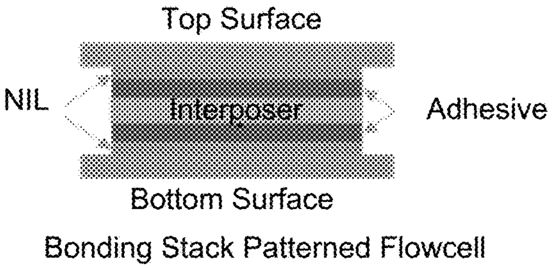
FIG. 6A is a schematic illustration of a cross-section of an example bonded and patterned flow cell and FIG. 6B is a schematic illustration of a cross-section of an example bonded un-patterned flow cell used to test performance of various base layers and adhesives.
Figure 6B:
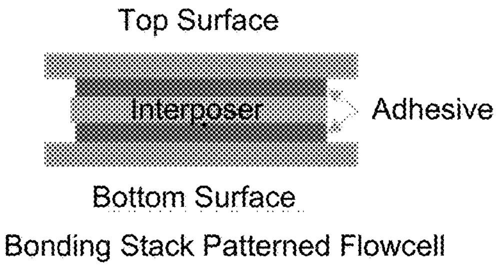

Flow Cell Configurations: Pressure sensitive adhesives (PSA) were applied to two different flow cell configurations as shown in FIGS. 6A and 6B. FIG. 6A is a schematic illustration of a cross-section of a bonded and patterned flow cell, i.e., a flow cell including wells patterned in a NIL resin disposed on a surface of glass substrates having an interposer bonded therebetween, and FIG. 6B is a schematic illustration of a cross-section of a bonded un-patterned flow cell having an interposer bonded directly to the glass substrate (i.e., does not have a resin on the substrates). FIG. 6A demonstrates the configuration on patterned flow cell with 100 micron thickness adhesive tape formed from about 25 micron thick pressure sensitive adhesives (PSAs) on about 50 micron thick black PET base layer. The patterned surface containing low surface energy materials which showed low bonding strength for some of the PSAs.

Material Screening Process: There were 48 different screening experiments for the full materials screening process. In order to screen the adhesive and carrier materials in high throughput, the screening processes were divided into five different priorities as summarized in Table I. Many adhesives failed after stage 1 tests. The early failures enabled screening of a significant number of materials (>20) in a few weeks.

TABLE I

Material screening process.

| Priority | # | Test | Type | Surface Type | Method |
|---|---|---|---|---|---|
| 1 | 1 | Optical | Fluorescence(532 nm) | / | Typhoon, 450PMT BPG1 filter |
| 1 | 2 | Optical | Fluorescence(635 nm) | / | Typhoon, 475PMT LPR filter |
| 1 | 3 | Adhesion | Lap shear($N/cm^2$) | Glass | Kapton, 5 × 10 mm, 40/mm, 20 psi Lamination, 3 day cure |
| 1 | 4 | Adhesion | Peel(N/cm) | Glass | Kapton, 5 × 10 mm, 40/mm, 20 psi lamination, 3 day cure |
| 1 | 5 | Adhesion | Easy to bond | Glass | Visual check for voids after bond |
| 1 | 6 | FTIR | FTIR | Glass | 4000-500 cm-1, FTIR-ATR |
| 1 | 7 | Buffer Stress | Lap shear($N/cm^2$) | Glass | 3 day, pH 10.5, 1M NaCl, 0.05% tween 20, 60 degrees Celsius. Kapton, 5 × 10, 40/mm, 20 psi lamination |
| 1 | 8 | Buffer Stress | Peel(N/cm) | Glass | 3 day, pH 10.5, 1M NaCl, 0.05% tween 20, 60 degrees Celsius, Kapton, 5 × 10, 40/mm, 20 psi lamination |
| 1 | 9 | Dimensions | Thickness (um) | / | Adhesive, liner and carrier thickness by micrometer |
| 2 | 10 | Adhesion | Lap shear($N/cm^2$) | NIL | Kapton, 5 × 10 mm, 40 mm/min, 20 psi lamination |
| 2 | 11 | Adhesion | Peel(N/cm) | NIL | Kapton, 5 × 10 mm, 40 mm/min, 20 psi lamination |
| 2 | 12 | Buffer Stress | Lap shear($N/cm^2$) | NIL | 3 day, pH 10.5, 1M NaCl, 0.05% tween 20, 60 degrees Celsius Kapton, 5 × 10 mm, 5 mm/min, 20 psi lamination |
| 2 | 13 | Buffer Stress | Peel(N/cm) | NIL | pH 10.5, 1M NaCl, 0.05% tween 20, 60 degrees Celsius Kapton, 5 × 10, 5 mm/min, 20 psi lamination |
| 2 | 14 | Formamide stress | Lap shear($N/cm^2$) | Glass | 24 hr, 60 degrees Celsius, formamide. Kapton, 5 × 10 mm, 40 mm/min, 20 psi lamination |

TABLE I-continued

Material screening process.

| Priority | # | Test | Type | Surface Type | Method |
|---|---|---|---|---|---|
| 2 | 15 | Formamide stress | Peel(N/cm) | Glass | 24 hr, 60 degrees Celsius, formamide. Kapton, 5 × 10 mm, 40 mm/min, 20 psi lamination |
| 2 | 16 | Vacuum | Voids | Glass | 24 hr, 60 degrees Celsius, Vacuum, 5 × 20 mm, adhesive bonded glass on both sides, Nikon imaging system |
| 3 | 17 | Formamide stress | Lap shear($N/cm^2$) | NIL | 24 hr, 60 degrees Celsius, formamide. Kapton, 5 × 10 mm, 40 mm/min, 20 psi lamination |
| 3 | 18 | Formamide stress | Peel(N/cm) | NIL | 24 hr, 60 degrees Celsius, formamide. Kapton, 5 × 10 mm, 40 mm/min, 20 psi lamination |
| 3 | 19 | Vacuum | Voids | NIL | 24 hr, 60 degrees Celsius, Vacuum, 5 × 20 mm, adhesive bonded glass on both sides, Nikon imaging system |
| 3 | 20 | Overflow, Laser cut | Overflow, Laser cut | Glass | 10× Microscope image |
| 3 | 21 | Overflow, Plot cut | Overflow, Plot cut | Glass | 10× Microscope image |
| 3 | 22 | Swell in Buffer | Thermogravimetric analysis (TGA) | / | 24 hr buffer soaking at 60 degrees Celsius, TGA 32-200 C., 55 Celsius/min, calculate weight loss |
| 3 | 23 | Swell in Formamide | TGA | / | 24 hr formamide soaking at 60 degrees Celsius, TGA 32-200 Celsius, 5 C./min, calculate weight loss |
| 3 | 24 | Solvent Outgas | TGA | / | TGA 32-200 Celsius and FTIR |
| 3 | 25 | 4 degrees Celsius stress | Lap shear($N/cm^2$) | Glass | 24 hr 4 Celsius. Kapton, 5 × 10 mm, 40 mm/min, 20 psi lamination, 3 day cure |
| 3 | 26 | 4 degrees Celsius stress | Peel(N/cm) | Glass | 24 hr 4 degrees Celsius, Kapton, 5 × 10 mm, 40 mm/min, 20 psi lamination, 3 day cure |
| 3 | 27 | −20 degrees Celsius stress | Lap shear($N/cm^2$) | Glass | 24 hr −20 degrees Celsius, Kapton, 5 × 10 mm, 40 mm/min, 20 psi lamination, 3 day cure |
| 3 | 28 | −20 degrees Celsius stress | Peel(N/cm) | Glass | 24 hr −20 degrees Celsius, Kapton, 5 × 10 mm, 40 mm/min, 20 psi lamination, 3 day cure |
| 4 | 29 | Vacuum | Lap shear($N/cm^2$) | Glass | 24 hr, 60 degrees Celsius, vacuum, Kapton, 5 × 10, 40/mm, 20 psi lamination, 3 day cure |
| 4 | 30 | Vacuum | Peel(N/cm) | Glass | 24 hr, 60 degrees Celsius, vacuum, Kapton, 5 × 10 mm, 40 mm/min, 20 psi lamination, 3 day cure |
| 4 | 31 | Vacuum | Lap shear($N/cm^2$) | NIL | 24 hr, 60 degrees Celsius, vacuum, Kapton, 5 × 10 mm, 40 mm/min, 20 psi lamination, 3 day cure |
| 4 | 32 | Vacuum | peel(N/cm) | NIL | 24 hr, 60 degrees Celsius, vacuum, Kapton, 5 × 10 mm, 40 mm/min, 20 psi lamination, 3 day cure |
| 5 | 33 | Curing | Time | Lap shear($N/cm^2$) | Glass 1 day |
| 5 | 34 | Curing | Time | Lap shear($N/cm^2$) | Glass 2 day |

TABLE I-continued

Material screening process.

| Priority | # | Test | Type | Surface Type | Method |
|---|---|---|---|---|---|
| 5 | 35 | Curing | Time | Lap shear($N/cm^2$) | Glass 3 day |
| 5 | 36 | Curing | Time | Peel(N/cm) | Glass 1 day |
| 5 | 37 | Curing | Time | Peel(N/cm) | Glass 2 day |
| 5 | 38 | Curing | Time | Peel(N/cm) | Glass 3 day |
| 5 | 39 | Curing | Time | Lap shear($N/cm^2$) | NIL 1 day |
| 5 | 40 | Curing | Time | Lap shear($N/cm^2$) | NIL 2 day |
| 5 | 41 | Curing | Time | Lap shear($N/cm^2$) | NIL 3 day |
| 5 | 42 | Curing | Time | Peel(N/cm) | NIL 1 day |
| 5 | 43 | Curing | Time | Peel(N/cm) | NIL 2 day |
| 5 | 44 | Curing | Time | Peel(N/cm) | NIL 3 day |
| 5 | 45 | Outgas | GC-MS | / | 60 degrees Celsius 1 hr and GC-MS |
| 5 | 46 | Chemical leaching | DNA sequencing | Glass | PR2, 60 degrees Celsius, 24 hr baking, pumping between each cycles |
| 5 | 47 | Sequencing by synthesis compatibility | DNA sequencing | Glass | PR2, 60 degrees Celsius, 24 hr baking, pumping between each cycles |
| 5 | 48 | Thermal Cycle | Peel(N/cm) | Glass | −20 C. to 100 degrees Celsius |

Figure 7:
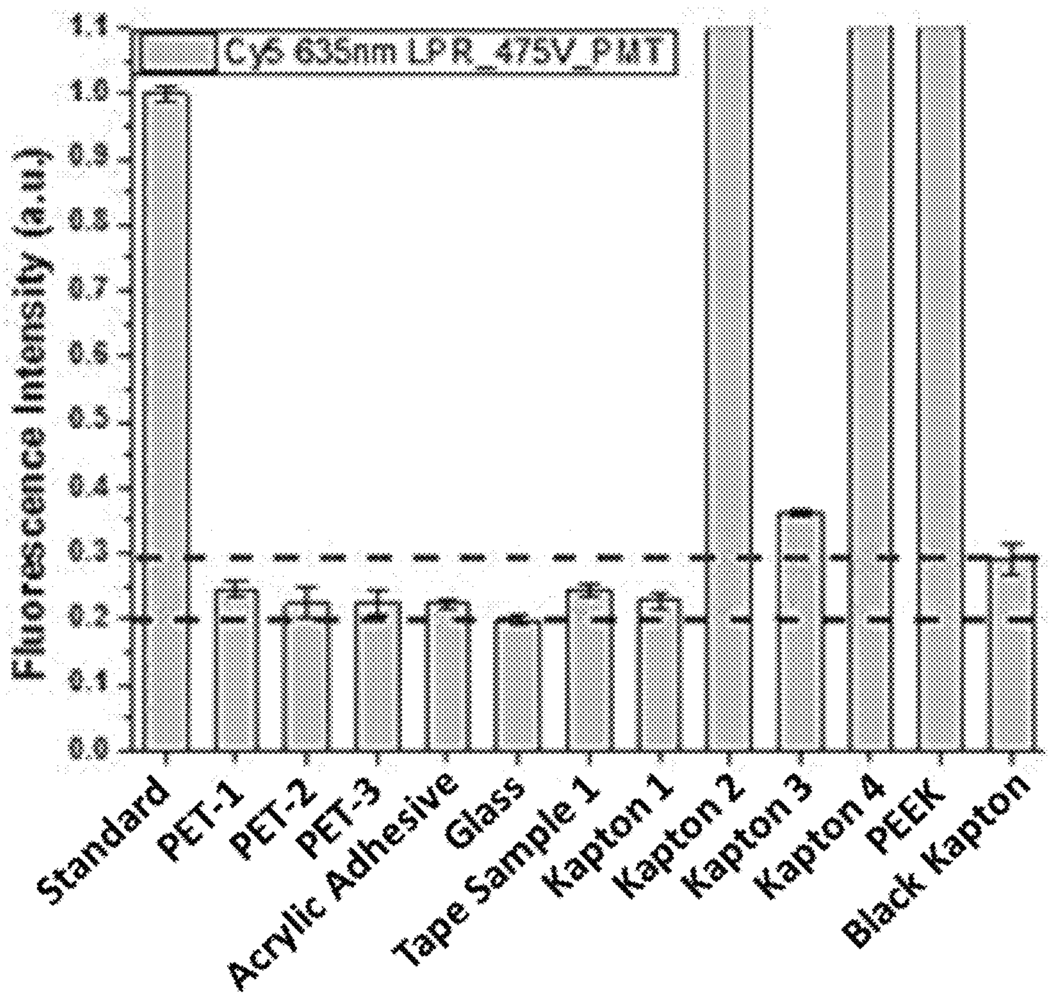
FIG. 7 is a bar chart of fluorescence intensity in the red channel of various adhesives and flow cell materials.
Figure 8:
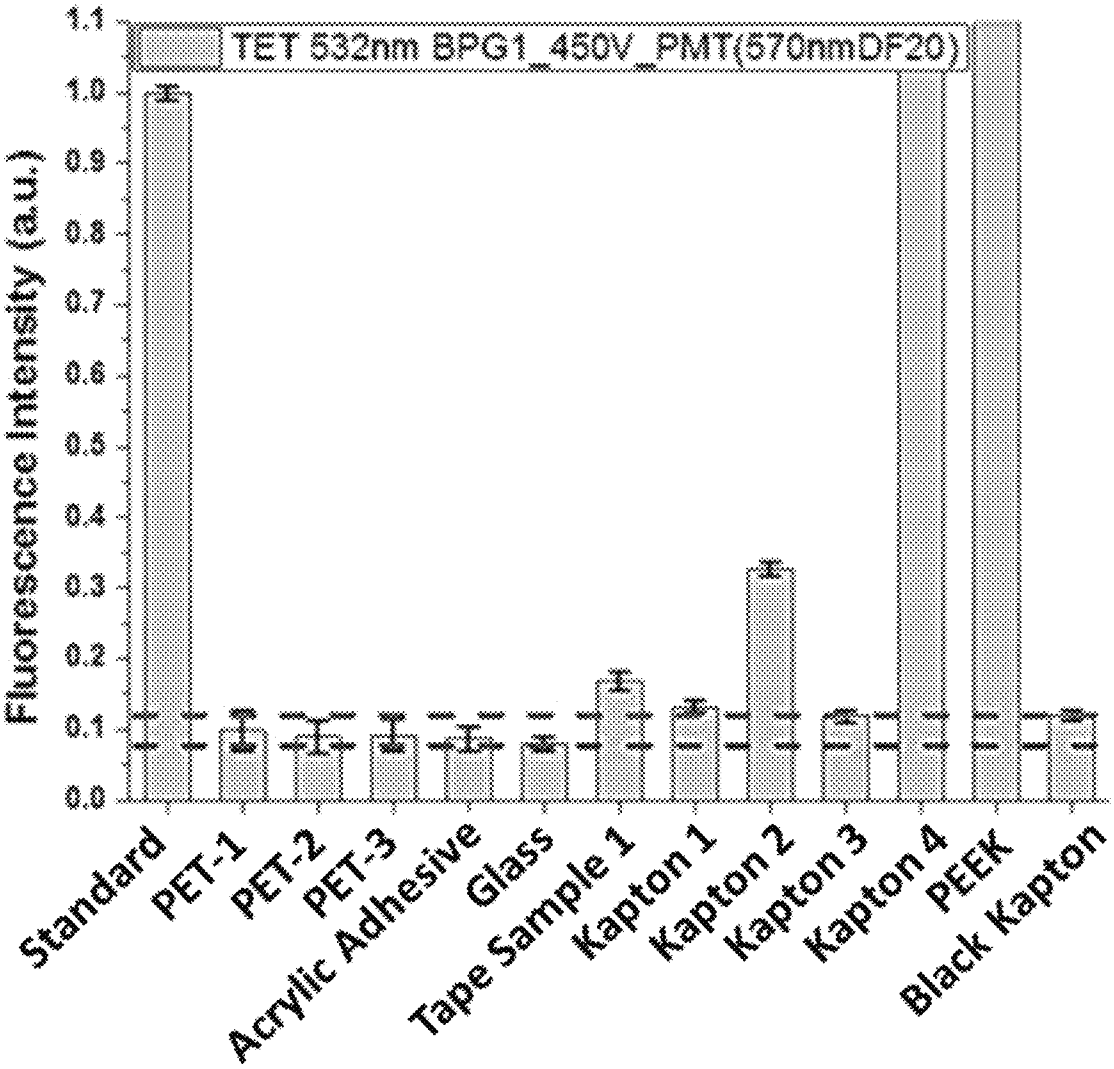
FIG. 8 is a bar chart of fluorescence intensity in the green channel of the various adhesives and flow cell materials of FIG. 7.

Auto-fluorescence properties: The auto-fluorescence properties were measured by confocal fluorescence scanner (Typhoon) with green (532 nm) and red (635 nm) laser as excitation light source. A 570 nm bandpass filter was used for green laser and a 665 long pass filter was used for red laser. The excitation and emission set up was similar to that used in an exemplary gene sequencing experiment. FIG. 7 is a bar chart of fluorescence intensity in the red channel of various adhesives and flow cell materials. FIG. 8 is a bar chart of fluorescence intensity in the green channel of the various adhesives and flow cell materials of FIG. 7. Table II summarizes the auto-fluorescence from each of the materials.

TABLE II

Auto-fluorescence measurements summary.

| Name | Fluorescence (532 nm) | Fluorescence (635 nm) |
|---|---|---|
| Tape Sample 1 | 102 | 72 |
| Tape Sample 2 | 176 | 648 |
| Tape Sample 2-Base layer only | 82 | 514 |
| Tape Sample 3 | 238 | 168 |
| Tape Sample 4-Base layer only | 83 | 81 |
| ND-C | 130 | 77 |
| Acrylic adhesive | 68 | 70 |
| PET-3 | 71 | 70 |
| PET-1 | 76 | 77 |
| PET-2 | 69 | 70 |
| Tape Sample-5 | 114 | 219 |
| Tape Sample-6 | / | / |
| Kapton 1 | 252 | 354 |
| Kapton 2 | 92 | 113 |
| Kapton 3 | 837 | 482 |
| Black Kapton | 100 | 100 |
| Polyether ketone (PEEK) | 3074 | 2126 |
| Glass | 61 | 62 |
| Adhesive tape | 100 | 100 |
| Reference | 834 | 327 |
| Ref | 777 | 325 |
| BJK | 100 | 100 |
| Acrylic adhesive-Batch 2 | 76.3 | 161.4 |

TABLE II-continued

Auto-fluorescence measurements summary.

| Name | Fluorescence (532 nm) | Fluorescence (635 nm) |
|---|---|---|
| Acrylic adhesive-75 microns thick | 75.2 | 76.4 |
| Acrylic adhesive-65 microns thick | 75.6 | 76.8 |
| Tape Sample 7 | 74.2 | 73.2 |
| Tape Sample 8 | 99.7 | 78.3 |

Tape Samples 1-4 and 7-8 were adhesives including thermoset epoxies, the Tape Sample-5 adhesive include a butyl rubber adhesive, and Tape Sample-6 includes an acrylic/silicone base film. As observed from FIGS. 7, 8 and Table II, the Black Kapton (polyimide) and Glass were employed as negative control. In order to meet the low fluorescence requirement in this experiment, any qualified material should emit less light than Black Kapton. Only a few adhesives or carriers pass this screening process including methyl acrylic adhesive, PET-1, PET-2, PET-3, Tape Sample 7 and Tape Sample 8. Most of the carrier materials such as Kapton 1, PEEK and Kapton 2 failed due to high fluorescence background. The acrylic adhesive has an auto-fluorescence in response to a 532 nm excitation wavelength of less than about 0.25 a.u. relative to a 532 nm fluorescence standard (FIG. 7), and has an auto-fluorescence in response to a 635 nm excitation wavelength of less than about 0.15 a.u. relative to a 635 nm fluorescence standard (FIG. 8), which is sufficiently low to be used in flow cells.

Figure 9A:
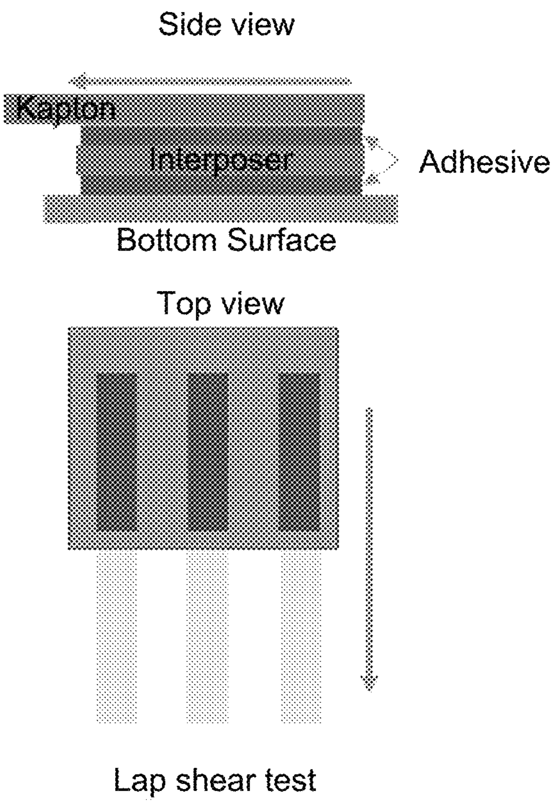
FIGS. 9A and 9B show schematic illustrations of an example lap shear test and an example peel test setup, respectively, for determining lap sheer strength and peel strength of various adhesives disposed on a glass base layer.
Figure 9B:
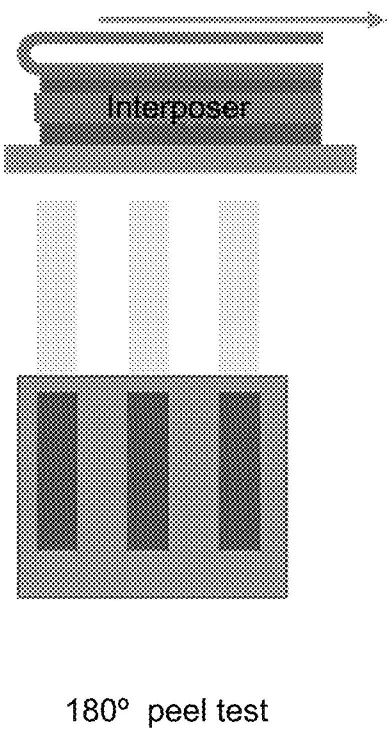

Adhesion with and without stress: The bonding quality, especially adhesion strength, should be evaluated for flow cell bonding. The lap shear stress and 180 degree peel test were employed to quantify the adhesion strength. FIGS. 9A and 9B show the lap shear and peel test setups used to test the lap shear and peel stress of the various adhesives. As show in FIGS. 9A and 9B, the adhesive stacks were assembly in sandwich structure. The bottom surface is glass or NIL surface which is similar to a flow cell surface. On the top of adhesive is thick Kapton film which transfers the force from instrument to adhesive during shear or peel test. Table III summarizes results from the shear and peel tests.

TABLE III

Shear and Peel Test Results

| Unit Name | Lap Shear (N/cm²) | Lap Shear after Stress | Lap Shear NIL | Lap Shear NIL Stress | Peel (N/cm) | Peel after Stress | Peel on NIL | Peel on NIL after Stress | Easy to Bond |
|---|---|---|---|---|---|---|---|---|---|
| Sample 1 | 113 ± 1.3 | 51 ± 1.1 | 66.7 | 77 | 9.2 ± 3.4 | 0.25 ± 0.11 | 0.73 ± 0.28 | 2.1 ± 0.38 | + |
| ND-C | 131 ± 4.7 | 122 ± 1.4 | / | / | 5.1 ± 0.2 | 2.5 ± 0.2 | / | / | ++ |
| Acrylic Adhesive | 111.7 ± 1.8 | 74.8 ± 0.4 | 65.2 ± 1.8 | 49.2 ± 7.0 | 3.6 ± 0.4 | 3.8 ± 0.6 | 3.35 ± 0.52 | 2.6 ± 0.16 | +++ |
| PET-3 | 106.2 ± 0.6 | 117.5 ± 4.5 | / | / | 0.6 ± 1.8 | 4.6 ± 1.4 | / | / | − |
| PET-1 | 90.9 ± 8.3 | 96.4 ± 4.0 | / | / | 0.4 ± 0.2 | 1.9 ± 0.2 | / | / | − |
| PET-5 | 100.5 ± 2.9 | 98.1 ± 1.2 | / | / | 0.9 ± 0.4 | 6.3 ± 0.8 | / | / | − |
| Tape Sample-5 | 49.8 ± 3.3 | 24.8 ± 2.1 | / | / | 1.8 ± 0.1 | 0.53 ± 0.08 | / | / | − |
| Tape Sample 6 | 89.8 ± 4.4 | 24.1 ± 0.6 | 56.4 ± 1.4 | 13.5 | 1.6 ± 0.1 | 0.71 ± 0.29 | 0.75 ± 0.17 | Fell apart | + |
| Adhesive tape | 500 ± 111 | | | | | | | | |

The initial adhesion of the adhesives test is shown in Table III. Most of the adhesives meet the minimum requirements (i.e., demonstrate >50 N/cm² shear stress and >1 N/cm peel force) on glass surface except PET-1, PET-2 and PET-3 which failed in peel test and also have voids after bonding. The Tape Sample 1 adhesive has relatively weak peel strength on NIL surface and failed in the test. The adhesives were also exposed to high salt and high pH buffer (1M NaCl, pH 10.6 carbonate buffer and 0.05% tween 20) at about 60 degrees Celsius for 3 days as a stress test. Tape Sample 5 and Tape Sample 1 lost more than about 50% of lap shear stress and peel strength. After the auto-fluorescence and bonding strength screening, the acrylic adhesive was the leading adhesive demonstrating all the desirable characteristics. ND-C was the next best material and showed about 30% higher background in red fluorescence channel relative to the acrylic adhesive.

Formamide, high temperature and low temperature stress: To further evaluate the performance of the adhesive in the application of flow cell bonding, more experiments were conducted on the acrylic, Tape Sample 5 and Tape Sample 1 adhesives. These included soaking in formamide at about 60 degrees Celsius for about 24 hours, cold storage at about −20 degrees Celsius and about 4 degrees Celsius for about 24 hour and vacuum baking at about 60 degrees Celsius for about 24 hour. All of the results are summarized in Table IV.

TABLE IV

Summary of formamide, high temperature and low temperature stress tests.

| Name | Acrylic Adhesive | Tape Sample 5 | Tape Sample 1 |
|---|---|---|---|
| Peel test, formamide exposure, 60 degrees Celsius for 24 hours | 1.41 ± 0.2 | 1.47 ± 0.12 | |
| Peel test, −20 degrees for 24 hours | 3.36 ± 0.5 | 1.9 ± 0.1 | |
| Peel test, 4 degrees Celsius for 24 hours | 4.1 ± 0.7 | 2.12 ± 0.14 | |
| Peel test, vacuum bake, 60 degrees Celsius and NIL resin on substrate | 3.5 ± 0.4 | 1.3 ± 0.3 | 2.36 |
| Lap shear, formamide exposure, 60 degrees Celsius for 24 hours | 77.8 ± 1.2 | 61.6 ± 4.4 | |
| Lap shear, vacuum bake, 60 degrees Celsius and NIL resin on substrate | 68.6 ± 2.4 | 35.7 ± 3.6 | 92.8 |
| Lap shear, −20 degrees Celsius for 24 hours | 76.4 ± 4.2 | 63.3 ± 1.1 | |
| Lap shear, 4 deg. Celsius 24 hr | 72.3 ± 3.4 | 69.4 ± 5.7 | |

Both adhesives pass most of the tests. However, Tape Sample 5 adhesive showed a lot of voids developed after vacuum baking and lost more than 40% of shear stress and didn't meet the minimum requirement. The acrylic adhesive also lost significant part of peel strength after formamide stress but still meets the minimum requirement.

Solvent outgas and overflow: Many reagents used in gene sequencing are very sensitive to impurities in the buffers or solutions which may affect the sequencing matrix. In order to identify any potential hazard materials released from the adhesives, thermogravimetric analysis (TGA), Fourier transform infrared (FTIR) and gas chromatography-mass spectroscopy (GC-MS) were used to characterize the basic chemical structures of adhesive and out gas from adhesive. According to TGA measurement, the dry acrylic, ND-C and Tape Sample 5 adhesives show very little weight loss (0.5%). Tape Sample 1 showed more than 1% weight loss which may indicate higher risk of release harmful material during sequencing run.

Figure 10:
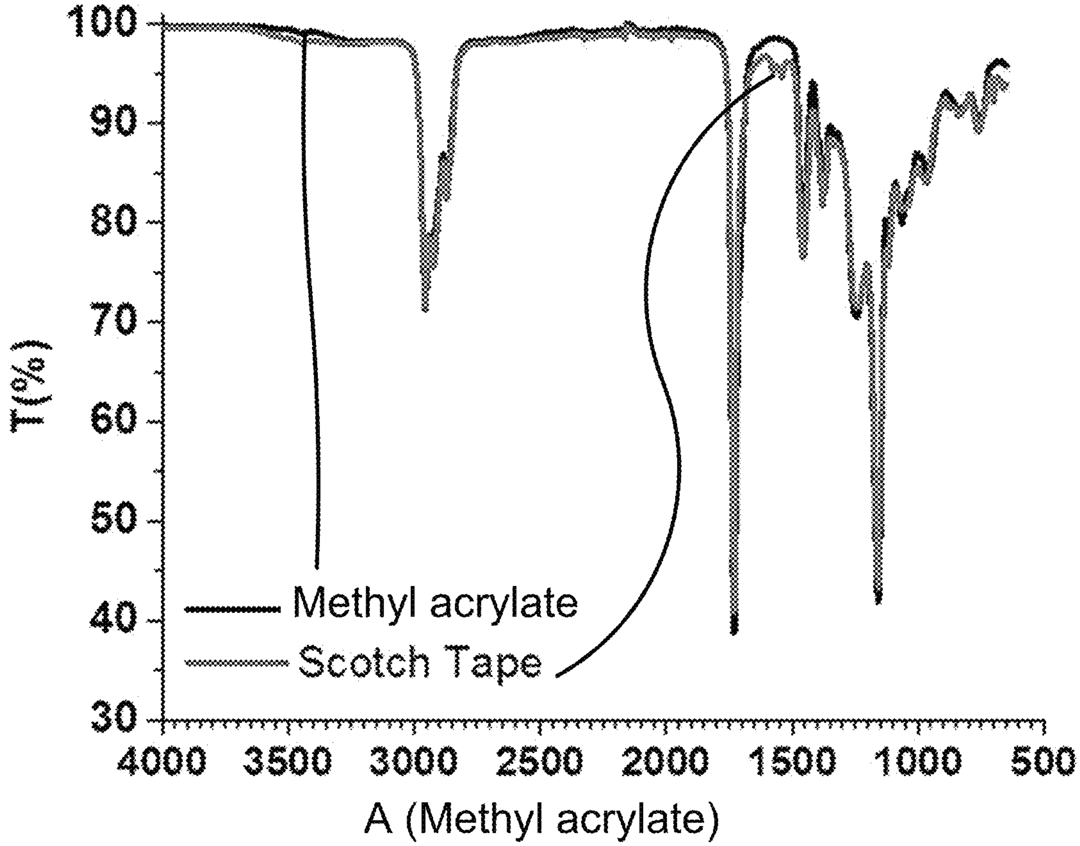
FIG. 10 is an example Fourier Transform Infrared (FTIR) spectra of an acrylic adhesive and Scotch tape.

The adhesive weight loss was also characterized after formamide and buffer stress. Acrylic adhesive showed about 1.29% weight loss which indicate this adhesive is more suspected to formamide and aligned with previous stress test in formamide. Tape Sample 5 showed more weight loss after buffer stress (about 2.6%) which also explained the poor lap shear stress after buffer stress. The base polymer of the acrylic adhesive and ND-C were classified as acrylic by FTIR. Biocompatibility of acrylic polymer is well known and reduces the possibility of harmful materials being released during a sequencing run. FIG. 10 is a FTIR spectrum of the acrylic adhesive and scotch tape. Table V summarize the results of TGA and FTIR measurements.

TABLE V

| Summary of TGA and FTIR measurements. | | | | |
|---|---|---|---|---|
| Name | Acrylic adhesive | ND-C | Fralock-1 | 3M-EAS2388C |
| TGA(32 to 200 degrees Celsius | 0.41% | 0.43% | 0.48% | 1.06% |
| TGA after buffer stress | 0.41% | / | 2.60% | / |
| TGA after formamide | 1.29% | / | 0.84% | / |
| FTIR | Acrylic | Acrylic | Butyl Rubber | Acrylic-Silicone |

Figure 11:
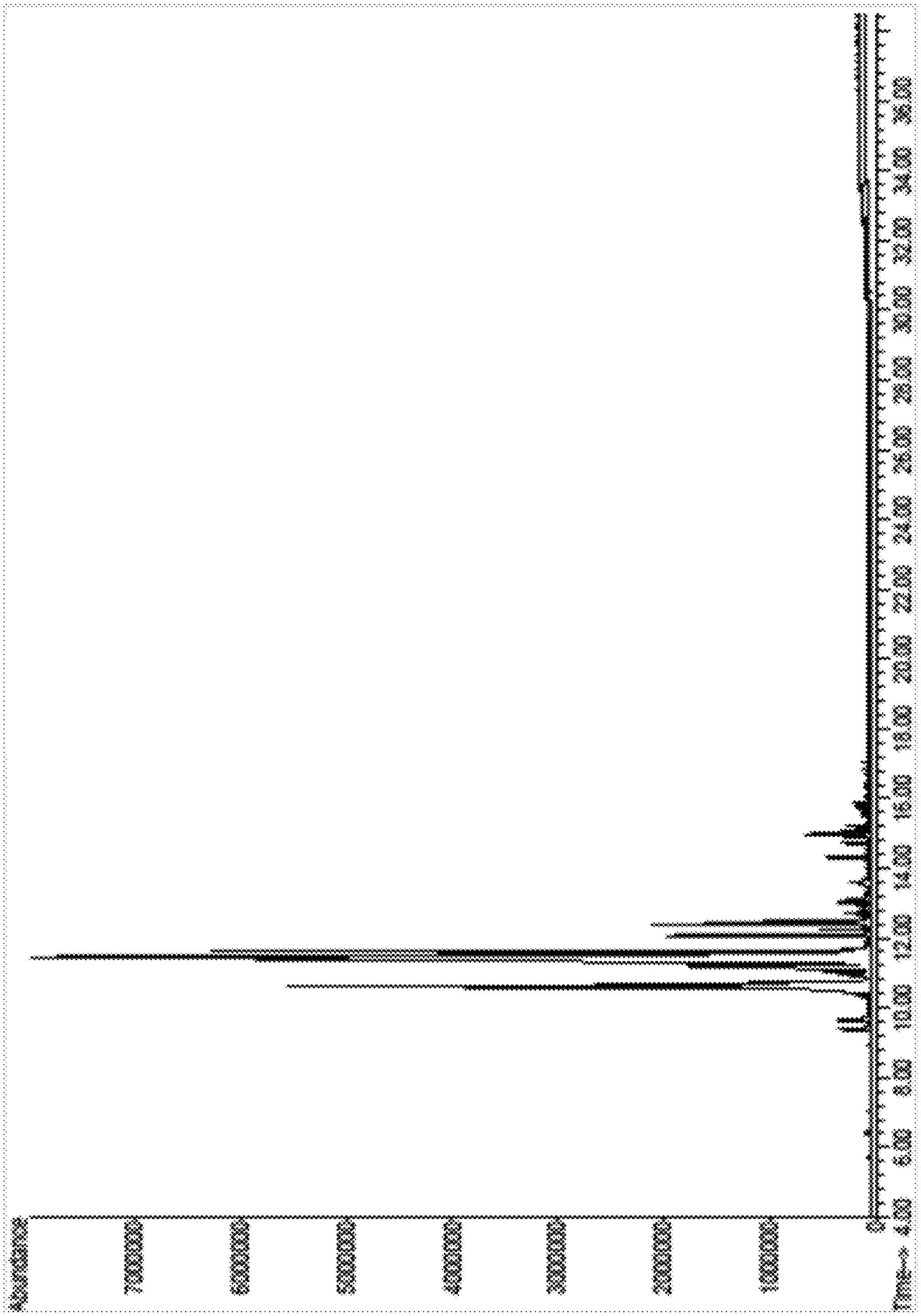
FIG. 11 is an example gas chromatography (GC) spectrum of acrylic adhesive and Black Kapton.
Figure 12:
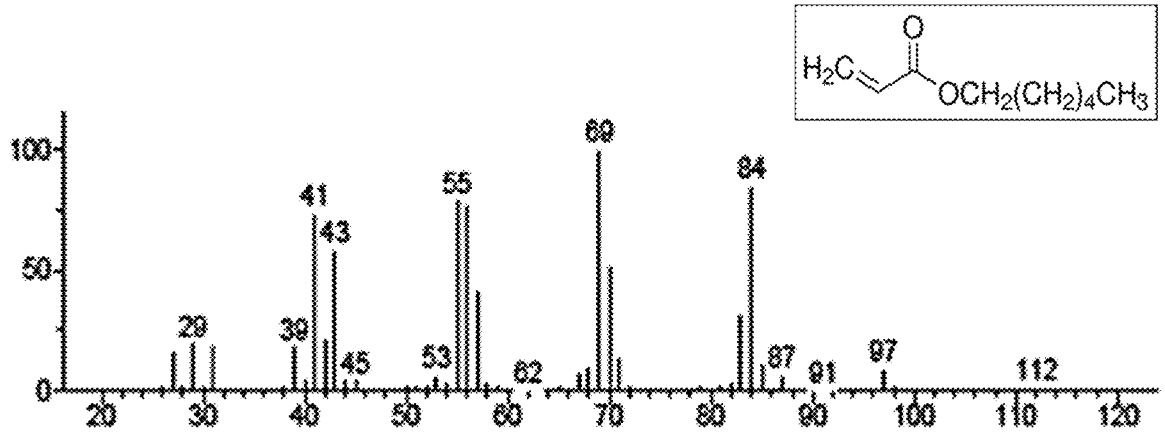
FIG. 12 is an example mass spectroscopy (MS) spectrum of an outgas compound released from the acrylic adhesive and the outgas compounds possible chemical structure.

To further investigate the outgas from the acrylic adhesive, acrylic adhesive and Black Kapton were analyzed by GC-MS. Both samples were incubated at about 60 degrees Celsius for one hour and outgas from these materials was collected by cold trap and analyzed by GC-MS. As show in FIG. 11, there is no detectable out gas from Black Kapton and about 137 ng/mg of total volatiles was detected from acrylic adhesive after one hour baking at 60 degrees Celsius. The amount of out gas compounds is very limited and only about 0.014% of the total weight of the acrylic adhesive. All of the out gas compounds were analyzed by GC-MS, there are all very similar to each other and originated from acrylic adhesives including acrylate/methacrylate monomer and aliphatic side chains etc. FIG. 12 demonstrated the typical MS spectra of these out gas compounds with inset showing the possible chemical structure of the out gassed compound. Since acrylic and methacrylic adhesives are generally known to be biocompatible, the small of amount of acrylate/methacrylate out gas is not expected to have any negative impact on the gene sequencing reagents.

The following implementations are encompassed by the present disclosure:

1. An interposer, comprising: a base layer having a first surface and a second surface opposite the first surface; a first adhesive layer disposed on the first surface of the base layer; a second adhesive layer disposed on the second surface of the base layer; and a plurality of microfluidic channels extending through each of the base layer, the first adhesive layer, and the second adhesive layer.

2. The interposer of clause 1, wherein: the base layer comprises black polyethylene terephthalate (PET); the first adhesive layer comprises acrylic adhesive; the second adhesive layer comprises acrylic adhesive.

3. The interposer of clause 2, wherein a total thickness of the base layer, first adhesive layer, and second adhesive layer is in a range of about 1 to about 200 microns.

4. The interposer of clause 2 or 3, wherein the base layer has a thickness in a range of about 10 to about 100 microns, and each of the first adhesive layer and the second adhesive layer has a thickness in a range of about 5 to about 50 microns.

5. The interposer of any of clauses 1-4, wherein the each of the first and second adhesive layers has an auto-fluorescence in response to a 532 nm excitation wavelength of less than about 0.25 a.u. relative to a 532 nm fluorescence standard.

6. The interposer of any of the preceding clauses, wherein the each of the first and second adhesive layers has an auto-fluorescence in response to a 635 nm excitation wavelength of less than about 0.15 a.u. relative to a 635 nm fluorescence standard.

7. The interposer of any of clauses 2-6, wherein the base layer comprises at least about 50% black PET.

8. The interposer of clause 7, wherein the base layer consists essentially of black PET.

9. The interposer of any of clauses 2-8, wherein each of the first and second adhesive layers is comprises at least about 5% acrylic adhesive.

10. The interposer of clause 9, wherein each of the first and second adhesive layers consists essentially of acrylic adhesive.

11. The interposer of any of the preceding clauses, further comprising: a first release liner disposed on the first adhesive layer; a second release liner disposed on the second adhesive layer; wherein the plurality of microfluidic channels extends through each of the base layer, the first adhesive layer, and the second adhesive layer, and the second release liner, but not through the first release liner.

12. The interposer of clause 11, wherein: the first release liner has a thickness in a range of about 50 to about 300 microns; and the second release liner has a thickness in a range of about 25 to about 50 microns.

13. The interposer of clause 11 or 12, wherein: the base layer comprises black polyethylene terephthalate (PET); and each of the first and second adhesive layers comprises acrylic adhesive.

14. The interposer of any of clauses 11-13, wherein the first release liner is at least substantially opaque and the second release liner is at least substantially transparent.

15. A flow cell comprising: a first substrate; a second substrate; and the interposer of any of clauses 2-10 disposed between the first substrate and the second substrate, wherein the first adhesive layer bonds the first surface of the base layer to a surface of the first substrate, and the second adhesive layer bonds the second surface of the base layer to a surface of the second substrate.

16. The flow cell of clause 15, wherein each of the first and second substrates comprises glass, and wherein a bond between each of the first and second adhesive layers and the respective surfaces of the first and second substrates is adapted to withstand a shear stress of greater than about 50 $N/cm^2$ and a peel force of greater than about 1 N/cm.

17. The flow cell of clause 15, wherein each of the first and second substrates comprises a resin layer that is less than about one micron thick and includes the surface that is bonded to the respective first and second adhesive layers, and wherein a bond between each of the resin layers and the respective first and second adhesive layers is adapted to withstand a shear stress of greater than about 50 $N/cm^2$ and a peel force of greater than about 1 N/cm.

18. The flow cell of clause 17, wherein: a plurality of wells is imprinted in the resin layer of at least one of the first substrate or the second substrate, a biological probe is disposed in each of the wells, and the microfluidic channels of the interposer are configured to deliver a fluid to the plurality of wells.

19. A method of patterning microfluidic channels, comprising: forming an interposer comprising: a base layer having a first surface and a second surface opposite the first surface, the base layer comprising black polyethylene terephthalate (PET), a first adhesive layer disposed on the first surface of the base layer, the first adhesive layer comprising acrylic adhesive, a second adhesive layer disposed on the second surface of the base layer, the second adhesive layer comprising acrylic adhesive; and forming microfluidic channels through at least the base layer, the first adhesive layer, and the second adhesive layer.

20. The method of clause 19, wherein the forming microfluidic channels involves using a $CO_2$ laser.

21. The method of clause 20, wherein: the interposer further comprises: a first release liner disposed on the first adhesive layer, and a second release liner disposed on the second adhesive layer; and in the step of forming the microfluidic channels, the microfluidic channels are further formed through the second release liner using the $CO_2$ laser, but are not formed through the first release liner.

22. The method of clause 21, wherein the $CO_2$ laser has a wavelength in a range of about 5,000 nm to about 15,000 nm, and a beam size in a range of about 50 to about 150 μm.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

As utilized herein, the terms "substantially' and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise arrangements and/or numerical ranges provided. Accordingly, these terms should be interpreted as indicating that insubstantial or inconsequential modifications or alterations of the subject matter described and claimed are considered to be within the scope of the inventions as recited in the appended claims.

It should be noted that the term "example" as used herein to describe various implementations is intended to indicate that such implementations are possible examples, representations, and/or illustrations of possible implementations (and such term is not intended to connote that such implementations are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary implementations are illustrative only. Although only a few implementations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary implementations without departing from the scope of the present invention.

What is claimed is:

1. A flow cell comprising:

a first substrate having a surface in which a plurality of wells are defined, wherein a biological probe is disposed in each of the wells;

a second substrate; and an interposer disposed in-between the first substrate and the second substrate, the interposer comprising:

a base layer having a first surface and a second surface opposite the first surface, the base layer comprising black polyethylene terephthalate (PET), a first adhesive layer bonding the first surface of the base layer to a surface of the first substrate, the first adhesive layer comprising acrylic adhesive, and a second adhesive layer bonding the second surface of the base layer to a surface of the second substrate, the second adhesive layer comprising acrylic adhesive, wherein:

a plurality of microfluidic channels are disposed within the interposer, the plurality of microfluidic channels extending through each of the base layer, the first adhesive layer, and the second adhesive layer, the plurality of microfluidic channels being configured to deliver a fluid to the plurality of wells.

2. The flow cell of claim 1, wherein each of the first and second substrates comprises glass, and wherein a bond between each of the first and second adhesive layers and the respective surfaces of the first and second substrates is adapted to withstand a shear stress of greater than about 50 N/cm2 and a peel force of greater than about 1 N/cm.

3. The flow cell of claim 1, wherein;

each of the first and second substrates comprises a resin layer that is less than about one micron thick, the resin layer of the first substrate includes the surface that is bonded to the first adhesive, the resin layer of the second substrate includes the surface that is bonded to the second adhesive layer, and a bond between each of the resin layers and the respective first and second adhesive layers is adapted to withstand a shear stress of greater than about 50 N/cm2 and a peel force of greater than about 1 N/cm.

4. The flow cell of claim 1, wherein a total thickness of the base layer, first adhesive layer, and second adhesive layer is in a range of about 1 to about 200 microns.

5. The flow cell of claim 1, wherein the base layer has a thickness in a range of about 10 to about 100 microns, and each of the first adhesive layer and the second adhesive layer has a thickness in a range of about 5 to about 50 microns.

6. The flow cell of claim 1, wherein the each of the first and second adhesive layers has an auto-fluorescence in response to a 532 nm excitation wavelength of less than about 0.25 a.u. relative to a 532 nm fluorescence standard.

7. The flow cell of claim 6, wherein the each of the first and second adhesive layers has an auto-fluorescence in response to a 635 nm excitation wavelength of less than about 0.15 a.u. relative to a 635 nm fluorescence standard.

8. The flow cell of claim 1, wherein the base layer comprises at least about 50% black PET.

9. The flow cell of claim 1, wherein the base layer consists essentially of black PET.

10. The flow cell of claim 1, wherein each of the first and second adhesive layers comprises at least about 5% acrylic adhesive.

11. The flow cell of claim 1, wherein each of the first and second adhesive layers consists essentially of acrylic adhesive.

* * * * *